(12) United States Patent
Angus et al.

(10) Patent No.: US 9,311,674 B2
(45) Date of Patent: Apr. 12, 2016

(54) MEDIA MANAGEMENT

(71) Applicant: NCR Corporation, Duluth, GA (US)

(72) Inventors: Robin Angus, Fife (GB); Neil Law, Dundee (GB); Andrew Monaghan, Dundee (GB); Willy Kaempfer, Bremgarten bei Bern (CH)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/897,744

(22) Filed: May 20, 2013

(65) Prior Publication Data

US 2014/0339301 A1    Nov. 20, 2014

(51) Int. Cl.
| | |
|---|---|
| *G06Q 40/00* | (2012.01) |
| *G06K 5/00* | (2006.01) |
| *G06F 17/00* | (2006.01) |
| *G06Q 40/04* | (2012.01) |
| *G06Q 10/08* | (2012.01) |
| *G07F 19/00* | (2006.01) |
| *G07D 11/00* | (2006.01) |

(52) U.S. Cl.
CPC ................ *G06Q 40/04* (2013.01); *G06Q 10/08* (2013.01); *G07D 11/0006* (2013.01); *G07D 11/0036* (2013.01); *G07D 11/0054* (2013.01); *G07D 11/0066* (2013.01); *G07D 11/0072* (2013.01); *G07F 19/209* (2013.01)

(58) Field of Classification Search
CPC ..... G06Q 10/087; G06Q 20/10; G06Q 40/00; G06Q 50/28; G07D 11/0069; G07D 11/006; G06F 19/00
USPC ........ 235/375, 379, 380, 385; 705/35, 39, 43, 705/28
See application file for complete search history.

(56) References Cited

U.S. PATENT DOCUMENTS

| | | | |
|---|---|---|---|
| 7,850,076 B1 * | 12/2010 | Dorenbaum ................. | 235/381 |
| 2004/0054607 A1 * | 3/2004 | Waddington et al. .......... | 705/28 |
| 2005/0108164 A1 * | 5/2005 | Salafia et al. .................. | 705/42 |
| 2011/0106681 A1 * | 5/2011 | Cockerell et al. .............. | 705/35 |
| 2013/0048721 A1 * | 2/2013 | Rasband et al. .............. | 235/383 |
| 2013/0140358 A1 * | 6/2013 | Graef et al. .................... | 235/379 |
| 2014/0143169 A1 * | 5/2014 | Lozito ........................... | 705/333 |

* cited by examiner

*Primary Examiner* — Laura Gudorf
(74) *Attorney, Agent, or Firm* — Schwegman, Lundberg & Woessner

(57) ABSTRACT

A method of managing transfer of cash, or other valuable media, is described. The method comprises: providing, to a first location, details of cash (or other media) to be loaded into a machine-readable cash container; associating the cash details with a unique identifier associated with the cash container; and storing the associated unique identifier and cash details. The method includes, at a subsequent time, receiving, from a second location to which the cash container has been transported, a request including the unique identifier read from the cash container; accessing the stored cash details using the unique identifier; and providing the stored cash details to the second location.

17 Claims, 11 Drawing Sheets

FIG. 3A

| UNIQUE ID | STATUS | LOCATION | CASH DETAILS | RETIRED? | CASH LOAD | CASH DEL. | ORDER |
|---|---|---|---|---|---|---|---|
| BAG123 | ACTIVE | TS001 | TABLE 40B | NO | TABLE 40C | TABLE 40D | TABLE 40E |
| CC124 | ACTIVE | ATM01 | TABLE 40B | NO | TABLE 40C | TABLE 40D | TABLE 40E |
| | | | | | | | |

FIG. 3B

| DENOM. | AMOUNT | NUMBER | SERIAL NO. |
|---|---|---|---|
| | | | |
| 20 | 10000 | 500 | |
| 10 | 10000 | 1000 | |

FIG. 3C

| LOCATION | NAMES | NUMBER | SERIAL NO. |
|---|---|---|---|
| CIT01 | | | |

FIG. 3D

| LOCATION | NAMES | COMPANY | REG NO. | TIME |
|---|---|---|---|---|
| BB152 | J. SMITH | CIT CO. | TS 665 DF4 | 11:30 – 04:21:2013 |

FIG. 3E

| ORDER NO. | TRANSACTION NO. | TIME SENT | COMPLETE? |
|---|---|---|---|
| CO 1523453 | TS 665 DF4 | 09:15 – 04:16:2013 | NO |

MEDIA MANAGEMENT

FIELD OF THE INVENTION

The present invention relates to media management across an enterprise. In particular, but not exclusively, the present invention relates to cash management for a bank, retailer, or other enterprise to allow tracking of cash throughout, and beyond, the enterprise.

BACKGROUND OF THE INVENTION

In current enterprises that manage large volumes of cash (such as large retailers and banks), orders for cash are issued to remote suppliers (for example, cash-in-transit companies), these orders are received at the enterprise (as inbound cash) and counted and/or authenticated by at least two members of the enterprise staff. The inbound cash may then be moved to a vault, where it is stored. The cash in the vault may be distributed to self-service terminals (such as ATMs or self-checkout point of sale terminals) or staff operated cash terminals (such as teller stations or point of sale terminals). Excess cash at the self-service terminals (which may be cash deposit ATMs) and/or the staff operated terminals may be moved to the vault for safe storage. If the vault has excess cash, then some of the cash in the vault may be removed and sent to the remote supplier (as outbound cash). All of these cash movements (inbound, outbound, and intra-enterprise) are typically recorded in a general ledger for the enterprise. Many of these movements have to be recorded and reconciled manually using paper records.

Furthermore, to secure cash transactions (inbound, outbound, and intra-enterprise), most enterprises currently operate on a "two pairs of eyes" policy. As such, each transaction in which cash transfers take place must be conducted with a second bank employee as a witness. This means that there is a negative impact on productivity wherever cash transactions are to be carried out and that staff members must often be used to supervise cash movement as it is re-located from one location to another across an enterprise. Even in small to medium-size enterprises, this activity can add up in time terms to more than one full-time equivalent staff member. Across a large enterprise this accumulates to be a significant negative contribution to operating efficiency and thus increases operational costs.

Furthermore, there is a delay in reconciling transactions because paper-based recording and reconciliation is used.

SUMMARY OF THE INVENTION

It is an aim of the present invention to at least partly mitigate the above-mentioned problems.

It is an aim of certain embodiments of the present invention to provide a method and apparatus for tracking media item containers located in a container store.

It is an aim of certain embodiments of the present invention to provide a method and apparatus for collecting and/or providing access to data from one or more media item containers located in a container store via a single, primary NFC tag of the container store in an automated and convenient way.

It is an aim of certain embodiments of the present invention to provide a method and apparatus for updating a cash management system with record data associated with respective cash containers located in a container store responsive to the addition/removal of media items into/from a respective container and/or the addition/removal of a container from the container store.

According to a first aspect of the present invention there is provided a method of managing transfer of cash, the method comprising: providing, to a first location, details of cash to be loaded into a machine-readable cash container; associating the cash details with a unique identifier associated with the cash container; storing the associated unique identifier and cash details; receiving, from a second location to which the cash container has been transported, a request including the unique identifier read from the cash container; accessing the stored cash details using the unique identifier; and providing the stored cash details to the second location.

The method may comprise the further step of receiving, from the first location, further details of cash loaded into a machine-readable cash container. These further details may include details known only to an entity at the first location, for example, an identity of who will load the cash, who will deliver the cash, a registration plate of a vehicle that will be used to deliver the cash, or the like.

The step of providing, to a first location, details of cash to be loaded into a machine-readable cash container includes providing the unique identifier to the first location.

The above steps may be implemented by a cash management server implemented, for example, using one or more cloud servers.

The unique identifier may be selected from a list of unique identifiers registered for use in the cash management system. The list of unique identifiers may be registered with the cash management server. Each unique identifier may be listed as either active (if its corresponding cash container currently stores some cash) or inactive (if its corresponding cash container is empty and available for storing cash). A current location of cash container having a unique identifier may also be stored, so that the cash management system is aware of where each cash container is currently located. Each unique identifier may also be listed as either operational (if it is either active or inactive) or retired (if it is no longer operational). One example of a unique identifier that is retired is a unique identifier associated with a cash container in the form of a resealable bag that is torn and has had to be discarded).

The step of providing the unique identifier to the first location may include the step of identifying a unique identifier that is located at the first location and that is inactive.

Alternatively, the unique identifier associated with the cash container may be read at the first location and provided to the cash management server.

The unique identifier may be encoded as a radio-frequency code (such as an NFC code, an RFID code, or the like), an optical code (such as a UPC code, a 2D barcode, a text string, or the like), or any other convenient machine-readable code.

The first location may be registered with the cash management server as one of a plurality of predefined types of location. The predefined types of location may include, for example, a bulk currency delivery location (for example, a cash-in-transit (CIT) vehicle, a bullion center, or the like), a branch location (for example, a bank branch, a retail store, or the like), a self-service location (such as the location of an ATM, a self-checkout terminal, or the like), an assisted service location (such as a teller station, a point of sale terminal, or the like), a cash management center location (for example, a headquarters of the enterprise), or the like.

Handheld devices (such as conventional (off-the-shelf) smartphones or tablets) and/or fixed devices such as desktop computers may be registered with a location, so that any communication received from one of those devices is handled as received from that location. For example, a member of staff in a bullion center (a first location) may have a smartphone that communicates with the cash management server. Each communication received from this smartphone is identified as emanating from the first location.

Alternatively, or additionally, users may have to login to the cash management server when using a handheld or fixed device, so that the user is identified as being at a particular defined location (such as the first location) and/or associated with an entity providing a service (such as a currency delivery company).

The details of cash loaded into a machine-readable cash container may include: (i) details about the cash; (ii) details of the cash loading; (iii) details of the cash delivery; and/or (iv) details of a cash order to be fulfilled.

Details about the cash may include: the total amount of cash loaded, the amount of each denomination loaded, the number of items of each denomination (for example, the number of one hundred dollar banknotes, the number of ten cent coins, and the like), the condition of the (or each item of) cash, and/or the serial number of each banknote (which may be associated with a face value of that banknote). The condition of the cash (or of each item of cash) may relate to how worn, limp, stained, perforated, and/or torn each banknote is. The condition of the cash may relate to the intended purpose; for example, automated distribution by a machine (which may require high quality), or manual distribution by a human teller (which may only require lower quality).

Details of the cash loading may include: a location where the cash was loaded (for example, as a code, a text string, or the like) and/or the names of the people who loaded the cash.

Details of the cash delivery may include: a destination at which the cash is to be delivered, a name of a person (or persons), a company that will deliver the cash, and/or a vehicle registration used to deliver the cash, and/or a time (which may include the date) at which the cash is to be delivered (which may be an estimated delivery time or a time range).

Details of a cash order to be fulfilled may include a cash order serial number, a transaction number, or the like.

The machine-readable cash container may comprise: a currency cassette, a bag (which may be resealable or disposable, tamper responsive or tamper evident).

The cash container may be machine-readable by incorporating a wireless transmitter, such as an RFID tag (either as an active RFID tag or as a passive RFID tag), an NFC tag, or the like. Alternatively, or additionally, the cash container may be machine-readable by incorporating an optical code, such as a UPC barcode, a 2D barcode, a text and/or number string, or the like.

According to a second aspect of the present invention there is provided a method of operating a handheld device to reconcile a cash order received at a cash delivery location, the method comprising: reading, using the handheld device, a unique identifier on a received cash container; sending, using the handheld device, a request for details of cash loaded into the received cash container based on the read unique identifier; receiving the requested details at the handheld device; and sending, from the handheld device, a cash receipt confirmation message confirming that an amount of cash in the received cash container matches the requested details.

The step of sending, from the handheld device, a cash receipt confirmation message may comprise sending, from a first account, the cash receipt confirmation message.

The method may include the further step of sending, from a second account, a cash receipt confirmation message confirming that an amount of cash in the received cash container matches the requested details. This step has the advantage that the cash order is only completed when two different people (using the same handheld device, or two different handheld devices) confirm that the received cash matches the received details relating to the cash order.

The steps of reading the unique identifier on a received cash container; sending the request for details of cash loaded into the received cash container; receiving the requested details; and sending the cash receipt confirmation message may all be implemented at a second location. The second location may be a branch, such as a bank branch, or a retail location.

The method may include the further steps of: reading, using the handheld device, a unique identifier on a cash vault; and sending, using the handheld device, a message indicating that the received cash is being moved to the cash vault.

A user of the handheld device may execute an application ("app") on the handheld device that allows the user to select various commands (such as Count, Add, Remove, and Move). The app may communicate these commands to a cash management server (or, more particularly, to a cash management service executing on the cash management server), such that the app is a client of the cash management server. These commands may indicate to the cash management server what cash transfer operation is going to be performed by the user of the handheld device. The user may also use the handheld device to read the unique identifier associated with the cash container that will have the operation performed on it (for example, Add involves adding cash to a cash container, Remove involves removing cash from a cash container, Move involves moving the cash container from one location to another location, Count involves providing the cash management server with an updated count of the amount of cash currently in the cash container.

The cash management server (or the cash management service) may record the amount of cash currently stored in each cash container.

The cash container may house multiple independent cash containers. For example, a vault may be a cash container that has a unique identifier, and the vault may house currency cassettes (each having a unique identifier), resealable currency bags (each having a unique identifier), removable cash drawers for a teller or PoS terminal (each cash drawer having a unique identifier), and loose cash (for example, stored in a locked drawer or safe within the vault).

The cash management system may store information about the contents of the cash container associated with each unique identifier. This would enable the cash management system to identify the location within the enterprise of all of the cash.

According to a third aspect of the present invention there is provided a cash vault including a machine-readable unique identifier, the cash vault housing securely therein: a plurality of cash containers, each cash container having a unique identifier.

The plurality of cash containers may comprise: one or more currency cassettes, each currency cassette having a unique identifier; one or more resealable currency bags, each resealable currency bag having a unique identifier, one or more cash drawers for a teller or PoS terminal, each cash drawer having a unique identifier.

The cash vault may also house loose cash (for example, stored in a locked drawer or safe within the cash vault).

According to a fourth aspect of the present invention there is provided a cash management application operable to: (i) capture a unique identifier associated with a cash container; (ii) receive a destination to which the cash container is to be transferred; and (iii) transmit a cash transfer message including the captured unique identifier and/or the received destination.

The cash management application may be further operable to: receive information relating to an amount of cash to be added to the cash container; and transmit a cash top-up message including the captured unique identifier and the amount of cash added (or to be added) to the cash container.

The cash management application may be further operable to: receive information relating to an amount of cash to be removed from the cash container; and transmit a cash removal message including the captured unique identifier and the amount of cash removed from (or to be removed from) the cash container.

The cash management application may be further operable to: receive information relating to an updated count of the cash container; and transmit a current cash count message including the captured unique identifier and the amount of cash currently stored in the cash container.

The cash management application may be implemented by one or more of: a handheld cash management device; a self-service terminal (such as an ATM or a self-checkout terminal); an assisted service terminal; a teller station computer; a cash-in-transit vehicle computer, or the like.

When implemented by an SST, the cash management application may be executed by a servicer (such as a technician, engineer, or other authorized person) who is reconciling the contents of the SST, or by a software agent executing on the SST.

The cash management application may communicate these messages to a cash management server, such that the cash management application is a client of the cash management server. The cash management application may communicate these messages immediately, if there is a communications link, or may cache these messages and transmit them when a communications link becomes available.

In some embodiments, the unique identifier may be stored on a tag which also includes storage that includes information relating to the contents of the cash container associated with that unique identifier.

According to a fifth aspect of the present invention there is provided a cash management server operable to: (i) store a list of registered unique identifiers available for use, (ii) store a status of each registered unique identifier; and (iii) store a current location of each cash container having a registered unique identifier.

The cash management server may be further operable to: update a status of registered unique identifier from inactive to active. The status of a unique identifier may be updated (a) from inactive to active when a cash container associated with that unique identifier receives some cash; and (b) from active to inactive when a cash container associated with that unique identifier is emptied of cash.

The cash management server may be further operable to: associate an amount of cash currently stored in a cash container with a registered unique identifier for that cash container.

The cash management server may be further operable to: update an amount of cash currently stored in a cash container in response to, and using details included in, a cash top-up message received from an authorized application.

The cash management server may be further operable to: update an amount of cash currently stored in a cash container in response to, and using details included in, a cash removal message received from an authorized application.

The cash management server may be further operable to: update an amount of cash currently stored in a cash container in response to, and using details included in, a current cash count message received from an authorized application.

The cash management server may be further operable to: add a new unique identifier to the stored list of registered unique identifiers available for use, in response to a create new cash container message received from an authorized application.

The cash management server may be further operable to: remove a stored unique identifier from the stored list of registered unique identifiers available for use, in response to a retire cash container message received from an authorized application.

The cash management server may be further operable to: transmit a cash order request to a cash delivery location, where the cash order request includes an amount of cash to be delivered, a delivery destination, and optionally a unique identifier corresponding to the cash container to be used to deliver the cash.

The cash order request may further include details of the denominations (and/or currencies) to be provided as part of the cash order request, such as number, quality, fitness, and the like.

According to a sixth aspect of the present invention there is provided a method of managing transfer of valuable media, the method comprising: receiving, from a first location, details of valuable media to be loaded into a machine-readable valuable media container; associating the valuable media details with a unique identifier associated with the media container; storing the associated unique identifier and valuable media details; receiving, from a second location to which the media container has been transported, a request including the unique identifier read from the media container; accessing the stored valuable media details using the unique identifier; providing the stored valuable media details to the second location.

The valuable media may comprise: cash, casino chips, tickets, passes, or any other valuable commodity.

According to a seventh aspect of the present invention there is provided a method of managing transfer of cash, the method comprising: receiving, from a first location, details of cash loaded into a machine-readable cash container; associating the received details with a unique identifier associated with the cash container; storing the associated unique identifier and received cash details; receiving, from a second location to which the cash container has been transported, a request including the unique identifier read from the cash container; accessing the stored cash details using the unique identifier; providing the stored cash details to the second location.

The method may comprise the further step of providing the unique identifier to the first location prior to the step of receiving, from the first location, details of cash loaded into a machine-readable cash container.

According to an eighth aspect of the present invention there is provided a method of ascertaining information associated with at least one media item container, comprising: via a primary device associated with a container store in which at least one media item container is located, providing container record data for ascertaining at least one parameter associated with the at least one media item container.

Optionally, the method further comprises receiving the container record data from a secondary device of at least one respective media item container located in the container store.

Optionally, the primary device comprises a primary NFC tag and each media item container comprises a secondary NFC tag. Alternatively, the primary device and each secondary device may each comprise other suitable devices, such as an RFID device or the like.

Optionally, the container record data comprises tag record data.

Optionally, the method further comprises providing the tag record data by wirelessly communicating the tag record data from the primary NFC tag to an NFC tag reader device.

Optionally, the method further comprises operating an NFC tag reader device that comprises a mobile terminal of an authorized user to receive the tag record data from the primary NFC tag.

Optionally, the method further comprises transferring the tag record data from the mobile terminal to a remote server node.

Optionally, the method of transferring the tag record data to the remote server node comprises synchronizing the tag record data with data stored in the remote server node.

Optionally, the remote server node comprises a cloud-based data management system.

Optionally, the method further comprises indexing at least one container record, each associated with a respective container in the container store and stored at a remote server node, responsive to the tag record data.

Optionally, the tag record data comprises at least an index number associated with a respective container and which is stored in the primary NFC tag.

Optionally, the method further comprises retrieving the at least one parameter associated with the at least one media item container from the at least one container record stored at the remote server node in response to the index number of said respective container.

Optionally, the method further comprises providing at least one container record, each associated with a respective container in the container store and stored in the primary NFC tag, as the tag record data.

Optionally, the method further comprises, from the container record, ascertaining at least one parameter associated with the respective container.

Optionally, the step of ascertaining at least one parameter comprises ascertaining a unique ID of the respective media item container and/or at least one characteristic of one or more items of media contained in the respective media item container from the container record.

Optionally, the method further comprises providing a new container record when a respective new container is located in the container store and/or deleting an extant container record when a respective extant container is removed from the container store.

Optionally, the method further comprises providing an updated container record for a respective container each time an item of media is added to or removed from the container associated with the container record.

Optionally, the method further comprises automatically providing or deleting or updating a container record for a media item container by receiving data from a respective secondary NFC tag of the media item container at the primary NFC tag.

According to a ninth aspect of the present invention there is provided a method of tracking media item containers stored in a container store, comprising: reading data from a primary device associated with a container store in which at least one item of media container is located; and ascertaining a location of each media item container in the container store responsive to the read data.

Optionally, the primary device comprises a primary NFC tag and each media item container comprises a secondary NFC tag.

Optionally, the container record data comprises tag record data.

Optionally, the method further comprises updating tag record data stored in the primary NFC tag when a media item container is removed from or located in the container store.

According to a tenth aspect of the present invention there is provided a container store for locating at least one media item container, comprising: a secure enclosure for storing a plurality of media item containers; and a primary device, responsive to a secondary device of at least one respective media item container located in the container store, for ascertaining at least one parameter associated with the at least media item container.

Optionally, the primary device comprises a primary NFC tag and each secondary device comprises a secondary NFC tag.

Optionally, the primary NFC tag comprises a data store for storing tag record data associated with each media item container in the secure enclosure.

Optionally, the primary NFC tag is operable to allow a mobile NFC device to transfer data to/from the primary NFC tag from/to the mobile NFC device.

Optionally, the container store further comprises at least one NFC reader device that reads data from one or more secondary NFC tags on respective media item containers in the container store.

Optionally, the container store further comprises an interface that communicates data received at each reader device to the primary NFC tag.

Optionally, the container store further comprises a transmitter that communicates data stored in the primary NFC tag wirelessly.

Optionally, the transmitter is operable to transfer tag record data to/from a remote server node.

Optionally, the container store comprises a Self Service Terminal (SST) or a Cash in Transit (CIT) vehicle or a room in a building.

According to an eleventh aspect of the present invention there is provided a cash management system, comprising: a plurality of Self Service Terminals (SSTs), each for locating a plurality of cash containers and comprising a respective primary device responsive to a secondary device of at least one respective cash container located in the SST; and at least one remote server node that stores a container record, indexed by container record data, provided by the primary device, for ascertaining at least one parameter associated with the at least one respective cash container.

Optionally, the primary device comprises a primary NFC tag and each secondary device comprises a secondary NFC tag.

Optionally, the container record data comprises tag record data.

Optionally, the at least one parameter comprises a unique ID of a respective cash container, value and/or count and/or size of cash notes located in a respective container.

According to a twelfth aspect of the present invention there is provided a method of managing transfer of valuable media, the method comprising: providing electronic notification of a valuable media order, the notification including details of a machine-readable valuable media container; associating the valuable media order with a unique identifier associated with the valuable media container; updating the valuable media order as complete in response to an electronic fulfillment notification, where the electronic fulfillment notification includes the unique identifier associated with the valuable media container.

The step of updating the valuable media order as complete in response to an electronic fulfillment notification may include the electronic fulfillment notification including confirmation from two individuals that the valuable media order was delivered correctly. Each of the two individuals may login to the same application that provides the electronic fulfillment notification.

The method may include the further steps of: storing the associated unique identifier and valuable media order; receiving a request including the unique identifier read from the valuable media container; accessing the stored valuable media order using the unique identifier; providing the stored valuable media order. The valuable media order may comprise information about the valuable media (such as the number of items, any face value of the valuable media, a delivery destination, a delivery time, and the like).

According to a thirteenth aspect of the present invention there is provided a method of managing a transfer of valuable media, the method comprising: providing electronic notification of a valuable media transfer, the notification including details of a machine-readable valuable media container; associating the valuable media transfer with a unique identifier associated with the valuable media container; updating the valuable media transfer as complete in response to an electronic completion notification, where the electronic completion notification includes the unique identifier associated with the valuable media container.

The electronic completion notification may also include confirmation of completion from at least two different authorized users.

The step of updating the valuable media order as complete in response to an electronic fulfillment notification may include the electronic fulfillment notification including confirmation from two authorized users (who may be members of staff) that the valuable media order was completed correctly. Each of the authorized users may login to the same application that provides the electronic fulfillment notification.

The method may include the further step of: storing the associated unique identifier and details of the valuable media transfer.

The method may include the further step of: receiving a request including the unique identifier read from the valuable media container prior to the step of updating the valuable media transfer as complete.

The method may include the further steps of: accessing the stored valuable media transfer details using the unique identifier in response to receipt of a request including the unique identifier; and providing the stored valuable media transfer details.

The valuable media transfer details may comprise information about the valuable media (such as the number of items, any face value of the valuable media, a delivery destination, a delivery time, a condition of the valuable media, and the like).

The valuable media transfer may comprise a cash order, adding cash to a cash container, removing cash from a cash container, or the like.

According to a fourteenth aspect of the present invention there is provided a method of operating a handheld device to reconcile a cash order received at a cash delivery location, the method comprising: reading, using the handheld device, a unique identifier and cash order details from a tag on a received cash container; and sending, from the handheld device, a cash receipt confirmation message confirming that an amount of cash in the received cash container matches the read cash order details.

According to a fifteenth aspect of the present invention there is provided a method of operating a handheld device to reconcile a cash order received at a cash delivery location, the method comprising: reading, using the handheld device, a unique identifier and cash order details from a tag on a received cash container; and sending, from the handheld device, a cash receipt confirmation message confirming that an amount of cash in the received cash container matches the read cash order details.

According to a sixteenth aspect of the present invention there is provided a cash handling terminal comprising a machine-readable tag encoding details of a unique identifier; and a plurality of cash containers, each cash container including a machine-readable tag.

The cash handling terminal may comprise an automated teller machine, a teller cash recycler, a vault, or the like. The cash handling terminal may include software operable to read the unique identifiers from the machine-readable tags on cash containers stored therein, and to request a cash transfer using the unique identifier of the machine-readable tag associated with the ATM.

Certain embodiments of the present invention provide a method and apparatus for easily identifying information associated with at least one media item container located in a container store such as an ATM or a CIT vehicle or a secure room.

Certain embodiments of the present invention provide a "smart" or "intelligent" container store for locating one or more media item containers, such as a cassette or bag for cash notes, which includes a primary device, optionally in the form of an NFC tag, for identifying at least one parameter associated with a respective media item container. The primary device of the container store can store a unique identifier and/or other information and this can be automatically read, updated and tracked as a container and/or container store moves around a management system or during use of a container within the container store.

Certain embodiments of the present invention provide a method and apparatus for automatically providing, deleting or updating a container record associated with a respective media item container located in a container store when media items are added or removed from the respective media item container and/or when a media item container is located or removed from the container store.

Certain embodiments of the present invention provide a method and apparatus for automatically or semi-automatically and/or conveniently tracking media item containers located in a container store.

Certain embodiments of the present invention provide apparatus which can be retro-fitted to a conventional container store and media item containers and which enables the so modified container store and containers to operate in a way compatible with conventional techniques or to be tracked by mobile or fixed terminals in an automated way via NFC or RFID readers and trackers.

Certain embodiments of the present invention enable media item containers to be tracked, and their contents monitored, in a highly convenient manner by authorized personnel who must be provided only with a smartphone or other such handheld reader device. Alternatively, NFC or RFID or the like reader capability can be incorporated in a fixed terminal, such as an SST, and such tracking and monitoring occurs automatically as containers are loaded into or removed from the terminal and during use.

Certain embodiments of the present invention provide a cash management system which is able to continuously and automatically track containers and cash notes in use as they are utilized over a period of time. The system is able to accurately indicate when cash notes should be replenished at particular locations or when cash notes should be picked up from a location due to an overabundance.

Certain embodiments of the present invention enable events associated with cash containers to be tracked and for further information such as authorized personnel who have access to containers located in a container store at the time and location where such events occur. In this way, an audit trail can be improved with respect to conventional cash management systems.

Certain embodiments of the present invention provide a method and apparatus for collecting data from one or more media item containers located in a container store via a single, primary device such as an NFC tag of the container store.

Certain embodiments of the present invention provide a method and apparatus for updating a cash management system with record data associated with respective cash containers located in a container store responsive to the addition/removal of media items into/from a respective container and/or the addition/removal of a container from the container store.

BRIEF DESCRIPTION OF DRAWINGS

Embodiments of the present invention will now be described, by way of example only, with reference to the accompanying drawings in which:

FIGS. 3A to 3E are schematic diagrams illustrating some records maintained by a part (a cash management service) of the cash management system of FIG. 1;

DESCRIPTION OF EMBODIMENTS

Figure 1:
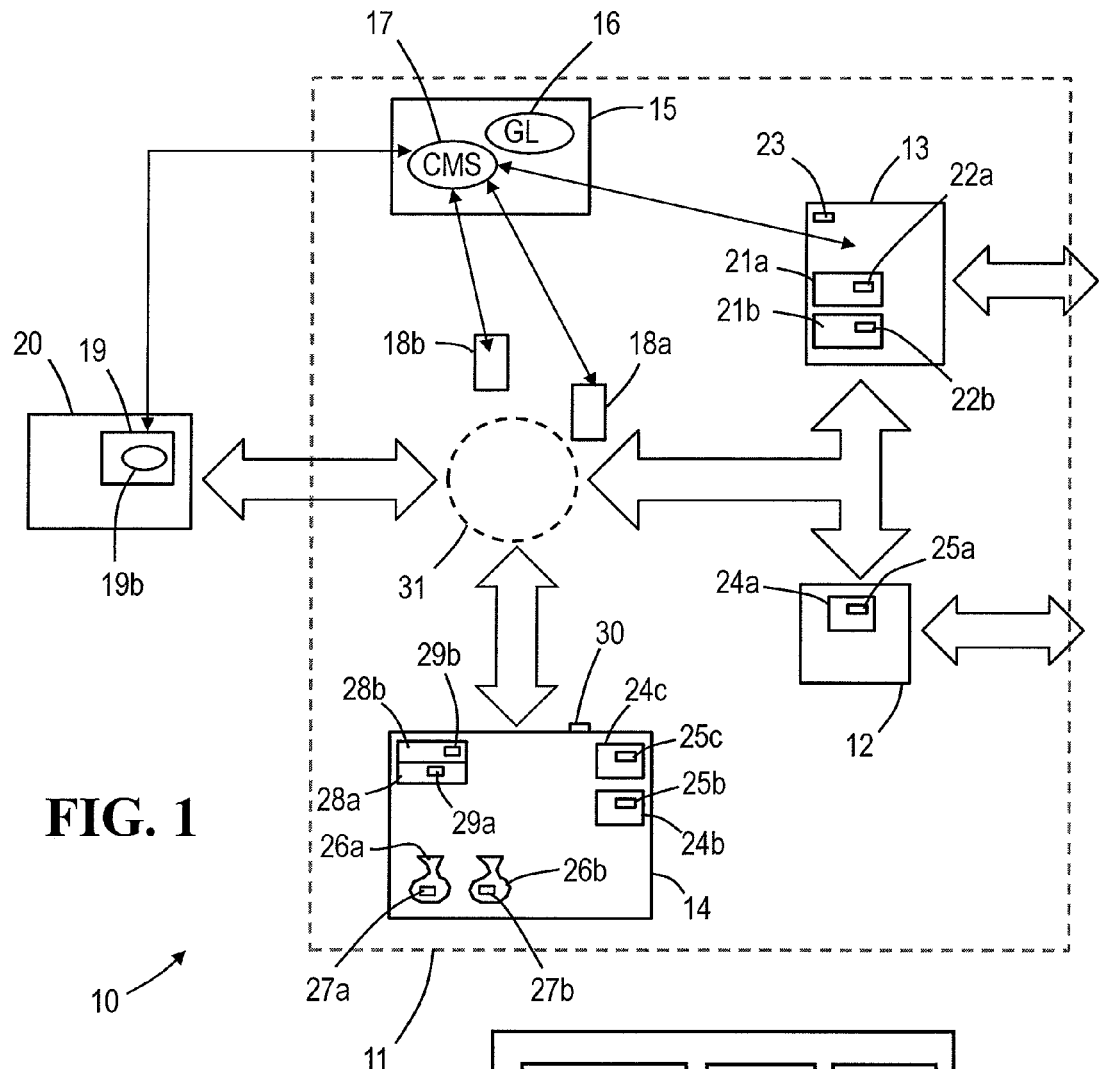
FIG. 1 is a pictorial diagram illustrating a cash management system according to one embodiment of the present invention.

In the drawings like reference numerals refer to like parts.
Reference is first made to FIG. 1, which is a pictorial diagram of a cash management system 10 according to one embodiment of the present invention. The cash management system 10 is implemented in a banking environment, which includes a bank branch 11 (shown in broken line). The bank branch 11 includes a plurality of teller stations 12 (only one of which is illustrated in FIG. 1, but a branch may typically have three or four such teller stations), a plurality of ATMs 13 (only one of which is illustrated in FIG. 1, but a branch may typically have two or three such ATMs), a branch vault 14 (which provides a secure store for cash used in the branch 11), and a cash management server 15.

The cash management server 15 executes general ledger software 16 and also executes a cash management service 17.

The general ledger software 16 is conventional banking software that records and reconciles transactions and cash movements relating to the branch 11.

The cash management service (CMS) 17 is software that communicates with various handheld devices 18 throughout the branch 11 and also with a remote computer 19 executing a cash delivery application 19b and located at a cash delivery center 20. In this embodiment, the cash delivery center 20 is a bullion center operated by a cash-in-transit company.

The cash management service 17 automates placing cash orders, tracking cash containers, and tracking movements of cash into, within, and out of the branch 11, as will be described in more detail below.

Cash is moved about within the branch 11 using cash containers, which take various forms.

Each ATM 13 includes cash containers in the form of currency cassettes 21, each currency cassette 21 including a unique identifier encoded as a text/number string and stored in an NFC tag 22 and associated with that currency cassette. Each ATM 13 also includes its own NFC tag 23 associated with that ATM 13.

Each teller station 12 includes a cash container in the form of a cash drawer 24, with an associated NFC tag 25 encoding a unique identifier associated with that cash drawer 24.

The branch vault 14 houses a variety of cash containers. These cash containers include (i) resealable cash bags 26, each having an NFC tag 27 encoding its own unique identifier, (ii) removable cash drawers 24 for teller stations, each cash drawer 24 having an NFC tag 25 encoding its own unique identifier, and (iii) fixed, lockable drawers 28 for securely storing loose cash, each fixed, lockable drawer 28 having an NFC tag 29 encoding its own unique identifier.

Two removable cash drawers are shown in vault 14; these are labeled 24b and 24c, and are in addition to the removable cash drawer 24a shown at teller station 12. These removable cash drawers 24 are interchangeable, and each may be used by only one staff member during his/her shift, then reconciled at the vault 14; such that another staff member starting his/her shift may take a removable cash drawer 24b from the vault 14 while the first staff member is reconciling his/her cash drawer 24a in the vault 14 at the end of his/her shift.

The vault 14 also includes it's a dedicated NFC tag 30 encoding its own unique identifier. The NFC tag 30 is mounted on an outside of the vault 14 so that it can be read by a user prior to entering the vault 14.

FIG. 1 also illustrates a central receiving area 31 (shown in broken line), which is the location in the branch 11 at which cash is received from, and dispatched to, cash delivery vehicles.

Figure 2:
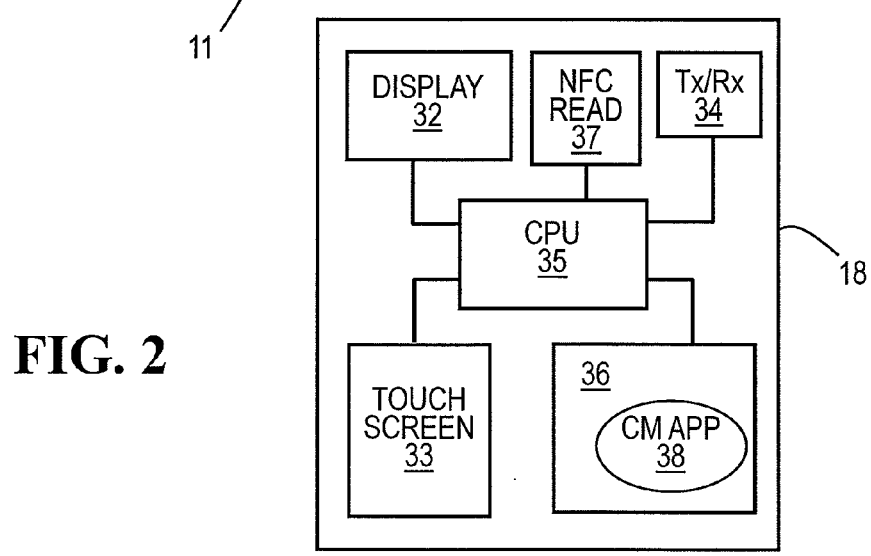
FIG. 2 is a simplified schematic diagram of a part (a handheld device) of the cash management system of FIG. 1.

Reference will now also be made to FIG. 2, which is a simplified schematic diagram illustrating the handheld device 18 in more detail. The handheld device 18 is in the form of a smartphone. Each smartphone 18 includes conventional hardware and software, including a display 32, a touchscreen 33, a cellular transceiver 34 (for making telephone calls), a processor 35, a memory 36, and an NFC reader 37 (which may be factory-fitted, or retro-fitted.

In addition to executing conventional software for the smartphone, the smartphone 18 also executes a cash management application (CM App) 38 to allow the user (such as an authorized member of the bank staff) to record transfers of cash into, within, and out of the branch 11. Each authorized user is registered to enable that user to access the cash management service 17 using a unique username and password.

Reference will now also be made to FIG. 3, which illustrates some records maintained by the cash management service 17. These records are illustrated as a series of tables 40 for ease of understanding, but they may be implemented by the cash management service 17 in any convenient manner (for example, as a look-up table, a relational database, a linked list, or in any other convenient manner). These records are only exemplary, additional and/or alternative records are anticipated for practical implementations.

As shown in FIG. 3, main table 40a comprises an entry (that is, a row 41) for each unique identifier that is, could be, or has been used in cash management system 10. Thus, the first column (the identifier column) 42 contains a unique identifier. In this embodiment, the first few letters of the unique identifier indicate the type of cash container that is associated with that unique identifier. For example, a unique identifier starting "BAG" is associated with a cash bag; whereas, a unique identifier starting "CC" is associated with an ATM currency cassette. In other embodiments, a separate field may be provided in the main table 40a to indicate the type of cash container that is associated with each unique identifier.

The second column 43 contains a status of that column (active or inactive). Active means that there is currently cash stored in a cash container associated with that unique identifier; inactive means that the cash container associated with that unique identifier is currently empty (no cash in it).

The third column 44 contains a location code for the cash container. That is, a code indicating where the cash container is currently located. For example, the removable cash drawer 24a may be listed as currently located at the teller station 12; whereas, the removable cash drawer 24b may be listed as currently located at the vault 14.

The fourth column 45 contains details about the cash. This column is illustrated in cash table 40b. Cash table 40b includes details of cash loaded into the cash container associated with that row's unique identifier. Cash table 40b comprises an entry for each denomination (banknote and coin) that could be loaded into a cash container.

The first column 45a is the denomination column. The first row in the denomination column 45a lists the first denomination available, the second row the second denomination available, and so on.

The second column 45b is the amount column (listing the total amount of that denomination stored in the cash container).

The third column 45c is the number of items column. This column 45c lists the number of items of that denomination that are loaded into the cash container. For example, there may be a thousand ten dollar banknotes, and five hundred twenty dollar banknotes; so the third column 45c would store the number one thousand for the denomination entry for ten dollars, and five hundred for the denomination entry for twenty dollars.

The fourth column 45d is the serial number column (which may not be used). This column 45d lists the serial numbers of that denomination (optionally in the order they are loaded) that are loaded into the cash container.

Returning to the main table 40a, the fifth column 46 indicates whether the cash container is operational or retired (that is, no longer available for use).

The sixth column 47 contains details about the cash loading. This column is illustrated in Cash loading table 40c. Cash loading table 40c includes details of the cash loading operation associated with the cash container having that row's unique identifier. Cash loading table 40c comprises only one row (for the cash container identified in column 42 of main table 40a) but multiple columns. The first column 47a stores a location where the cash was (or will be) loaded (for example, as a code, a text string, or the like). The second column 47b stores the names (or other identifiers) of the people who loaded (or will load) the cash.

Returning to the main table 40a, the seventh column 48 contains details about the cash delivery. This column 48 is illustrated in Cash delivery table 40d. Cash delivery table 40d includes details of the cash delivery operation associated with the cash container having that row's unique identifier. Cash delivery table 40d comprises only one row (for that cash container) but multiple columns.

The first column 48a stores a destination code identifying a destination at which the cash is to be delivered. The second column 48b stores a name of a person (or persons) who will deliver the cash. The third column 48c stores a name of a company that will deliver the cash (typically the employer of the persons listed in the second column 48b). The fourth column 48d stores a vehicle registration used to deliver the cash. The fifth column 48e stores a time (which includes the date) at which the cash is to be delivered; the format is hour: minute-month: day: year.

Returning to the main table 40a, the eighth column 49 contains details about a cash order to be fulfilled. This column 49 is illustrated in cash order table 40e. Cash order table 40e includes details of a cash order associated with the cash container having that row's unique identifier. Cash order table 40e comprises only one row (for that cash container) but multiple columns.

The first column 49a stores a cash order serial number. The second column 49b stores a transaction number. The third column 49c stores the time at which the cash order was sent to the cash supplier. The fourth column 49d indicates if the cash order has been completed or not.

It should be appreciated that the columns illustrated in FIGS. 3A to 3E are merely examples of the type of information that the cash management service 17 may record and update. Additional and/or alternative information that may be stored by the cash management service 17 includes information relating to the cash container, information relating to cash details, historical records for any of the preceding (for example, a previous value and the time of change to the current value), or the like.

Information relating to the cash container may include: currency cassette type (where the cash container is a currency cassette); the original manufacturing plant; the original manufacturing date; the last service date; the last service location; last service organization identifier; last servicer unique personnel identifier; the health status (such as, healthy/wounded/unserviceable); the last equipment host identifier (for example, an identifier of an ATM in which the currency cassette was last loaded), the scheduled equipment host identifier (for example, an identifier of an ATM into which the currency cassette is to be loaded); last data synchronization time, date and timezone; a count of automated banknote movements through the cash container (a running total); a count of automated banknote movements through the cash container (since last change of host equipment); a current item count (number of items contained); a current item count status (for example, machine validated, Operator validated, Suspect); a main currency currently stored within the cash container (ISO Code); a main denomination currently stored within the cash container; a current security status (for example, Healthy, Fault, Tamper); a last security status (for example, Healthy, Fault, Tamper); a last security status change time, date and time zone; or the like.

Information relating to cash details may include (to the extent not already described above): object number (nominal order in currency cassette); object identifier (for example, serial number, check codeline, or the like); object currency (for example, an ISO code if a banknote, if not a banknote then: check, voucher, or miscellaneous); object denomination (if a banknote); object emission (month/year); banknote category (use European Central Bank categorizations with provision for extended categories); actual object size (physical dimensions); or the like.

One type of cash transfer (a cash order) will now be described with reference to FIG. 4A, which is a flowchart 50 illustrating steps performed by the cash management service 17 to instruct a cash delivery to the bank branch 11 in the cash management system 10.

Initially, the cash management service 17 receives a request for a cash order (step 51). This request may come from an authorized user within the branch, from the General Ledger software 16, from a headquarters of the bank branch 11, or from another authorized source. The request includes details of the amount of cash requested (which may specify the denomination required and the number of items of each denomination), the delivery destination (that is, the branch 11), and the requested delivery time.

The cash management service 17 then authorizes the request (step 52). If the request is not authorized it is ignored.

If the request is authorized, then the cash management service 17 identifies an appropriate cash supplier (step 53). In this embodiment, the appropriate cash supplier is the cash delivery center 20 (FIG. 1).

Using the location code for this cash supplier, the cash management service 17 then accesses the tables 40 to select a suitable cash container (step 54). A suitable cash container is one that is (i) located at the cash supplier's premises (from column 44), inactive (from column 43), not retired (from column 46), and suitable to hold the required denominations. For example, an ATM currency cassette would not be suitable for transporting coins, or mixed denominations.

Once the suitable cash container has been identified, the cash management service 17 creates a new cash order (step 55) which includes the details of the requested cash, the unique identifier for the selected cash container, the delivery destination details, and the like.

The cash management service 17 then updates the tables 40, as appropriate, to include details of the newly created cash order (step 56). For example, the cash management service 17 updates: the status (column 43) to Active; the Cash table 40b to include details of the cash to be loaded into the selected cash container to prepare the cash order for delivery; the location where the cash will be loaded (in column 47a of cash loading table 40c); the relevant columns of cash delivery table 40d; and Cash order table 40e.

The cash management service 17 then transmits the new cash order to the remote computer 19 located at the cash supplier's offices 20.

Figure 4A:
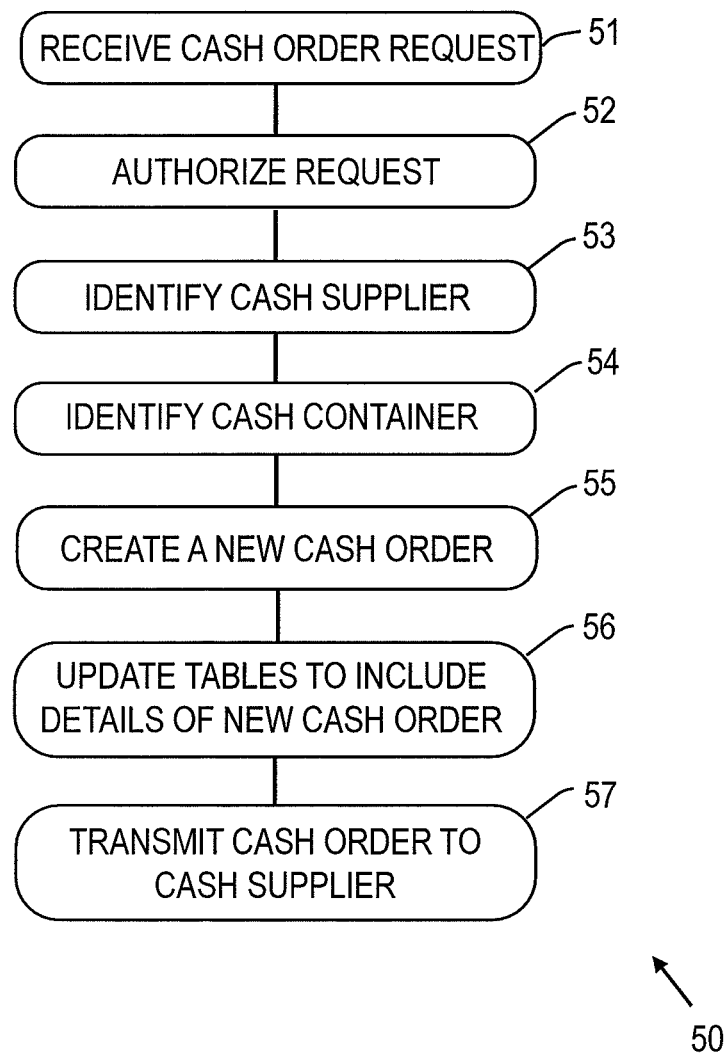
FIG. 4A is a flowchart illustrating steps performed by a cash management server to instruct a cash delivery to a destination (a bank branch) in the cash management system of FIG. 1.
Figure 4B:
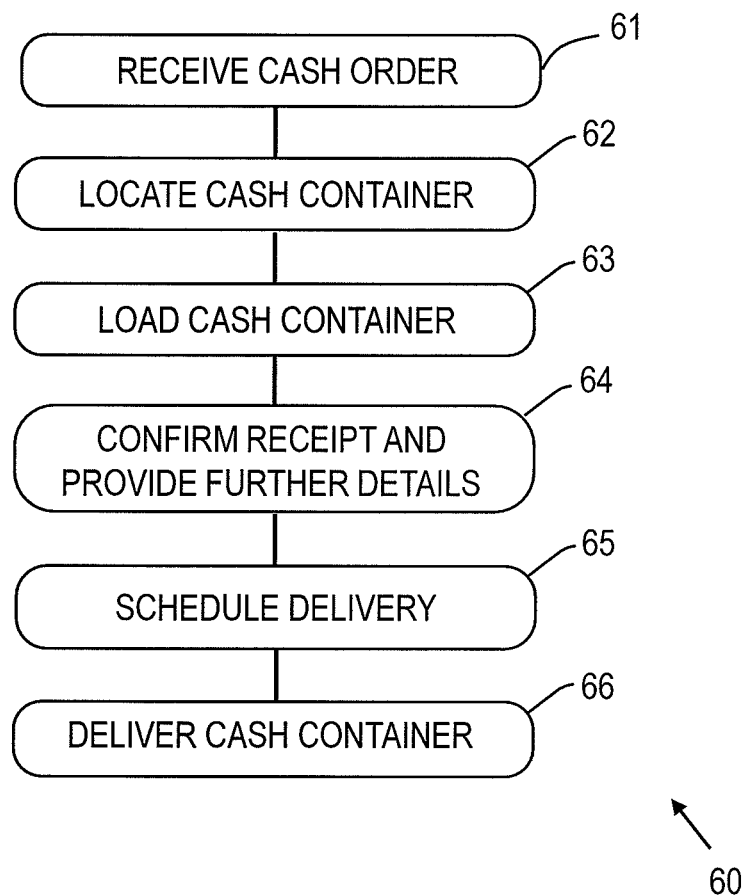
FIG. 4B is a flowchart illustrating steps performed by a cash delivery company to fulfil the cash delivery instructed in FIG. 4A.

Reference will now also be made to FIG. 4B, which is a flowchart 60 illustrating steps performed by the cash delivery company that received the new cash order described in FIG. 4a from the cash management service 17.

Initially, the remote computer 19 receives the new cash order (step 61) and confirms that it is from an authorized source (this may occur automatically if there is a secure connection between the cash management service 17 and the cash delivery application 19b).

A member of staff at the cash delivery center 20 then locates the cash container having a unique identifier corresponding to the unique identifier listed in the new cash order (step 62). This is implemented by the member of staff using a handheld device (similar to handheld device 18) to read the NFC tag on each cash container until the correct one is located. Because the unique identifier indicates the type of cash container in the first few letters (for example, BAG for a cash bag), the member of staff only has to check that type of cash container until the correct cash container is located.

Staff at the cash delivery center 20 then load the located cash container with the denominations specified in the newly-received cash order (step 63).

Once the cash container is loaded, a member of staff at the cash delivery center 20 sends a notification to the cash management service 17 to confirm receipt of the cash order and to provide further details (step 64). These details include the delivery time, confirmation that the requested denominations and amounts have been provided, serial numbers of banknotes (if requested), and details of the people and vehicle that will make the delivery.

It should be appreciated that although this step of providing a receipt and further details is illustrated as a single step, it may be implemented in multiple steps. For example, initial receipt may be confirmed immediately after receipt from the cash management service; details of the cash loaded into the cash container may be provided when the cash container is loaded; and details of who will deliver the cash container may be provided nearer the delivery time.

The cash management service 17 updates its tables 40 using these further details, for example, it updates some columns in the Cash loading table 40c and Cash delivery table 40d based on information provided by the cash delivery center 20.

Staff at the cash delivery center 20 then schedule delivery of the cash container (step 65) based on the delivery time requested in the cash order.

One or more members of staff of the cash delivery center 20 (or a trusted third party contracted by the cash delivery center 20 or the bank) (referred to herein as the delivery staff) then deliver the cash order to the branch at the designated time (step 66).

Figure 4C:
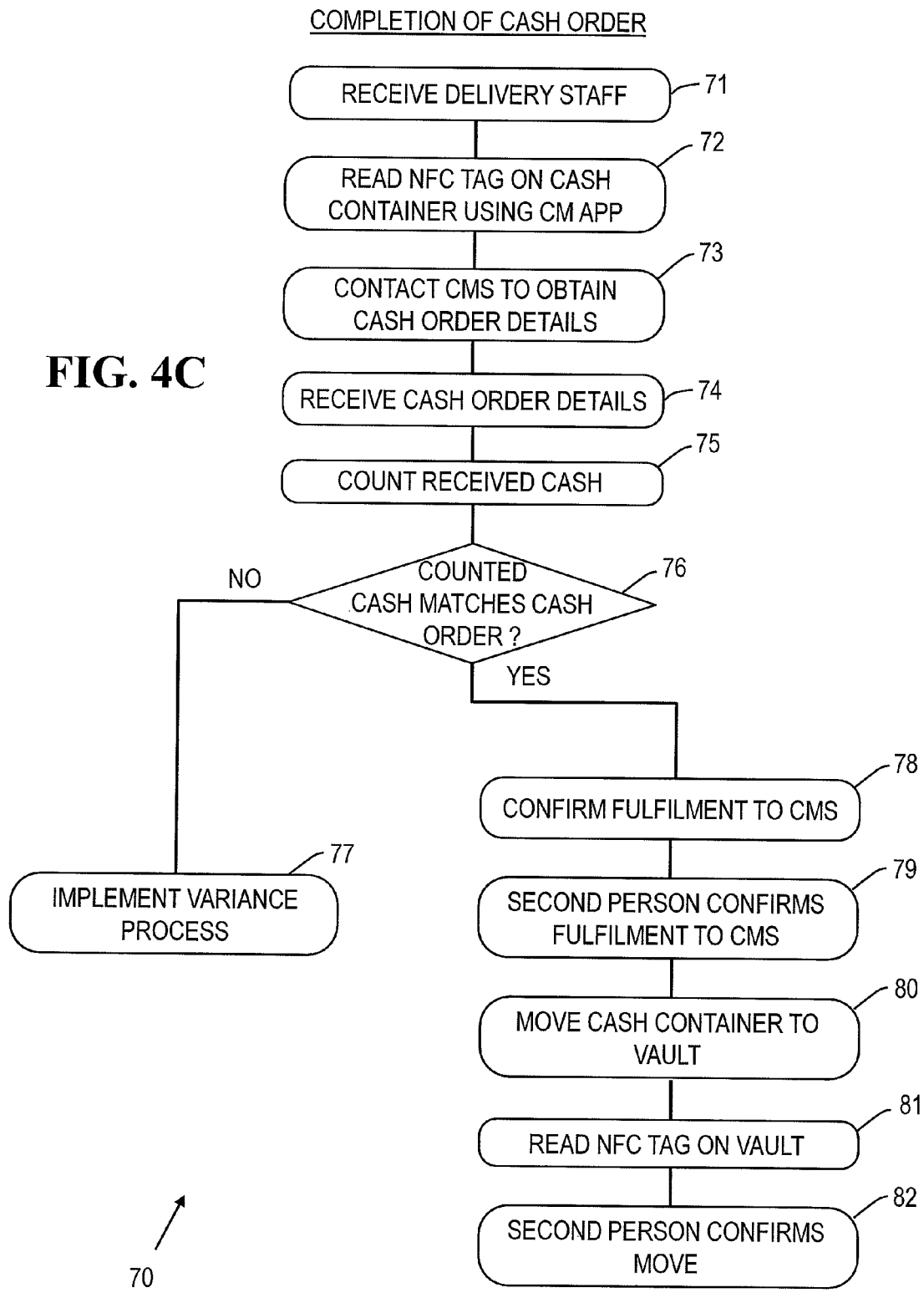
FIG. 4C is a flowchart illustrating steps performed at the destination (the bank branch) in receiving the cash delivery fulfilled in FIG. 4B.

Reference will now also be made to FIG. 4C, which is a flowchart 70 illustrating steps performed at the destination (the bank branch 11) in receiving the cash delivery from the cash delivery center 20.

Initially, the delivery staff bring the cash container into the branch 11 to the central receiving area 31, and two members of branch staff (each having a handheld device 18a,b) meet the delivery staff and cash container (step 71).

The first branch staff member launches the cash management application 38 on his/her handheld device 18a (which may require the branch staff member to login to the cash management service 17) and then uses the handheld device 18a to read the NFC tag on the cash container to detect the unique identifier (step 72).

The cash management application 38 sends the read unique identifier to the cash management service 17 (step 73). The cash management service 17 uses this unique identifier to access details of the cash order being fulfilled, and transmits these details back to the cash management application 38 executing on the first branch staff member's handheld device 18a.

The first branch staff member receives these cash order details (step 74). The two branch staff members then count the cash delivered in the cash container (this is referred to as "dual control" or "two pairs of eyes") (step 75).

The two branch staff members then compare the counted cash with the cash listed in the cash order details to verify that they match (step 76).

If the cash received does not match the cash order then a variance process is implemented (step 77). The variance process is defined by the bank and may involve returning the entire cash container with all of the received cash, or retaining the received cash and providing information about the amount of cash received.

If the cash received does match the cash order then the first branch staff member uses the cash management application 38 on his/her handheld device 18a to confirm to the cash management service 17 that the cash order has been fulfilled (step 78).

The first branch staff member then passes the handheld device 18a to the second branch staff member, who uses the cash management application 38 on that handheld device 18a to confirm to the cash management service 17 that the cash order has been fulfilled (step 79). This involves the second branch staff member logging in to the cash management service 17 as a supervisor (or at least as a second user) using the cash management application 38.

When the cash management service 17 receives confirmation from both the branch staff members that the cash order has been received and is correct, then the cash management service 17 updates the tables 40 to indicate that the cash order has been completed. The cash management service 17 also stores the identification of the two branch staff members who confirmed that the cash order was received correctly, for use in any subsequent audit.

At this point, the two branch staff members move the received cash container to the vault 14 in the branch 11 for safe storage (step 80). In this example, the cash container is a cash bag.

When the first branch staff member reaches the vault 14 with the cash container, the first branch staff member uses his/her handheld device 18a to read the NFC tag 30 on the outside of the vault 14 (step 81). This causes the cash management application 38 on his/her handheld device 18a to transmit the unique identifier read from the vault's NFC tag 30 to the cash management service 17.

The first branch staff member then passes the handheld device 18a to the second branch staff member, who uses the cash management application 38 on that handheld device 18a to confirm to the cash management service 17 that the cash container has been moved to the vault 14 (step 82). This involves the second branch staff member logging in to the cash management service 17 as a supervisor (or at least as a second user) using the cash management application 38.

Once the cash management service 17 has received both notifications, then the cash management service 17 knows that the cash container has reached the vault 14 and is safely stored therein.

The cash management service 17 updates the total amount of cash stored in the vault 14 based on the cash order amount; updates the tables 40, as necessary; and updates the location of the cash container (since it is now stored in the vault 14).

The cash management service 17 then updates the General Ledger software 16 to indicate the amount of cash now stored in the branch 11 (and in particular, in the vault 14).

Figure 5:
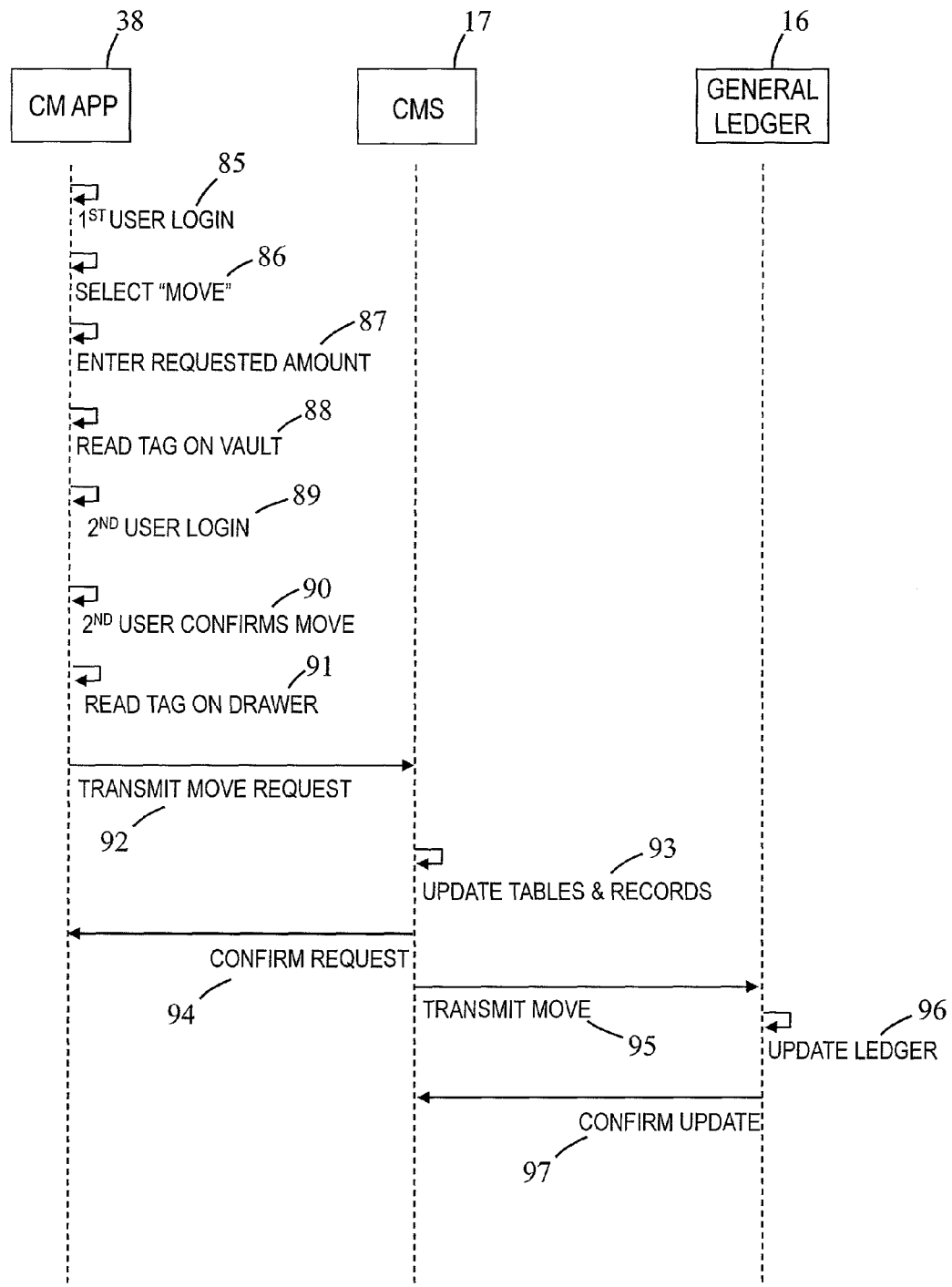
FIG. 5 is a state flow diagram illustrating steps performed in moving cash from one location in the bank branch (a vault) to another location in the bank branch (a teller station)

Reference will now also be made to FIG. 5, which is a flow diagram illustrating steps performed in moving cash from one location in the bank branch (the vault 14) to another location in the bank branch (the teller station 12) in the bank branch 11.

In this example, the first member of branch staff wants to add a hundred ten dollar bills and two hundred five dollar bills to the cash drawer 24a at the teller station 12.

As shown in FIG. 5, the first step is for the first staff member to login to the cash management application 38 on his/her handheld device 18a (step 85), if the staff member has not already done this.

Next, the staff member selects a Move Cash option on the cash management application 38 (step 86). The first staff member then enters the amounts of cash to be moved and the desired destination (step 87). This is implemented by the cash management application 38 presenting different denominations on the display 32 and allowing the first staff member to select a denomination and to enter the number of items of that denomination. The staff member can also select the destination from a list of destinations within the branch 11 (for example, the ATM 13 or the teller station 12). In this embodiment, the staff member selects the teller station 12 as the destination for the moved cash.

The staff member then locates another staff member (who may be a supervisor) and the two staff members go into the vault 14. This may require additional steps, for example, they may have to log their access to the vault 14.

The first staff member then uses the handheld device 18a to read the NFC tag 29b on one the lockable drawers 28b in the vault 14 (the source of the loose cash) (step 88).

The two staff members then open the lockable drawer 28b (this may occur prior to reading the NFC tag 29b if the NFC tag 29b is located inside the lockable drawer) and they remove the requested cash.

The second staff member (who may be the supervisor) then logs in to the cash management application 38 (step 89) and confirms that the cash has been removed (step 90).

The two staff members then walk over to the teller station 12 and add the loose cash to the removable drawer 24a and one of the staff members reads the NFC tag 25a on the cash drawer 24a using the handheld device 18a (step 91).

The cash management application 38 then transmits the move request to the cash management service 17 (step 92), which includes details of the read NFC tags 29b and 25a, the amount of cash moved, and the staff members involved.

The cash management service 17 then updates its tables 40 and other records (for example, records of how much cash is stored in each cash container) based on the information transmitted as part of the move request (step 93).

The cash management service 17 then confirms that the move request has been received (step 94), and transmits information about the cash that has been moved to the General Ledger software 16 (step 95).

The General Ledger software 16 updates its records about cash location (step 96) and sends a confirmation message back to the cash management service 17 (step 97).

This ensures that dual control is required to access the vault 14 and to transfer cash from the vault 14 (either as loose cash or in bag or currency cassette form).

A member of staff may also use the cash management application 38 to add cash to a cash container. For example, a member of staff can login to the cash management application 38, then select a Add cash menu option. The member of staff, together with another staff member, can then use the handheld device 18 to read the NFC tag on the source of the cash (which may be the vault 14 or it could be a currency cassette 21 removed the ATM 13, or a bag of cash 26). One of the staff members can input to the cash management application 38 the amount of cash to be added, and then use the handheld device 18 to read the NFC tag on the destination for the added cash. The other staff member would confirm this transaction using the cash management application 38. The cash management service 17 would then update its tables 40 and other records.

Similarly, if cash is to be removed from a cash container, then a member of staff can login to the cash management application 38 and select a Remove cash menu option presented by the cash management application 38. The member of staff, together with another staff member, can then use the handheld device 18 to read the NFC tag on the source of the cash (which may be the vault 14 or it could be a currency cassette 21 removed the ATM 13, or a bag of cash 26). One of the staff members can then input the amount of cash to be removed, and then read the NFC tag on the destination for the added cash. The other staff member would confirm this transaction using the cash management application 38. The cash management service 17 would then update its tables 40 and other records.

Another transaction option is to reconcile the contents of a cash container. This may involve a member of staff logging in to the cash management application 38 and select a Count cash menu option presented by the cash management application 38. The member of staff, together with another staff member, can then use the handheld device 18 to read the NFC tag on the cash container storing the cash to be counted. The staff members can then open the cash container, count the cash in the cash container, and enter this amount into the cash management application 38. Both staff members would confirm this transaction using the cash management application 38. The cash management service 17 would then update its tables 40 and other records.

Another menu option provided by the cash management application 38 is to Create a new cash container. This menu option may be used if some cash is to be loaded into a new container, and there is no registered container available. Unregistered cash containers (such as currency cassettes and resealable cash bags) may be stored in the branch 11 for use as required. The cash containers would have an NFC tag affixed to them (with a unique identifier). A member of staff would select the Create cash container option and then use the handheld device 18 to read an NFC tag on one of these cash containers. The cash management service 17 would then register this cash container and stored details about it in its tables 40.

Other embodiments of the present invention will now be described.

Figure 6:
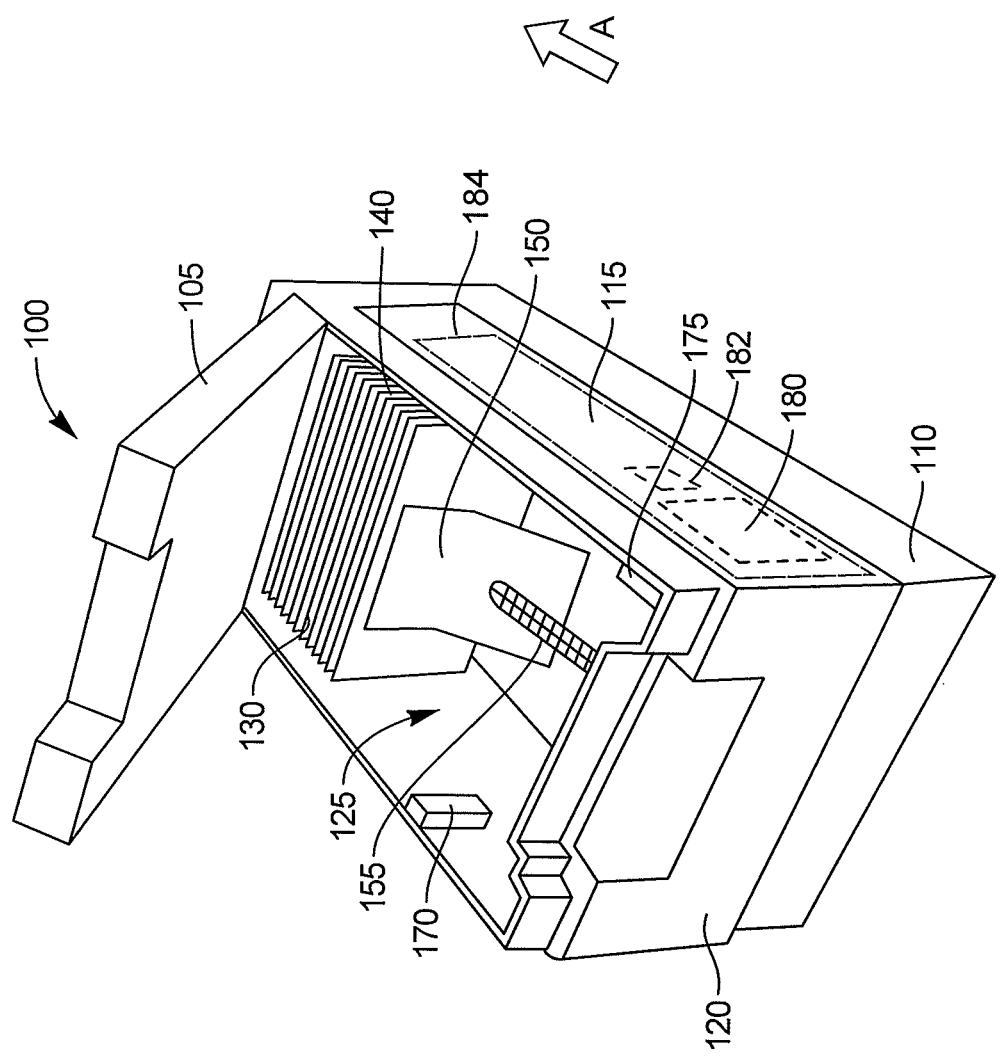
FIG. 6 illustrates a cash cassette according to an embodiment of the present invention.

FIG. 6 illustrates a media item container 100 in the form of a cash cassette, according to an embodiment of the present invention. It will be appreciated that certain embodiments of the present invention are broadly applicable to containers used to transport items of media such as cash notes, checks, vouchers, stamps or the like, from one location to another. As such, the cash cassette is an example of a valuable media container (VMC). Other examples of VMCs include: a bag, a check container or the like.

A VMC such as the cash cassette 100, may be located within a Media Store (not shown in FIG. 6), such as an automated teller machine (ATM), a cash in transit (CIT) vehicle, a cash vault, or the like. As used herein, a Media Store means a container that can house a plurality of VMCs. These VMCs may all be of the same type (for example, an ATM is an example of a Media Store that can house a plurality of cash cassettes) or of different types (for example, a CIT vehicle is an example of a Media Store that can house different types of VMCs, such as cash cassettes and cash bags).

The cash cassette 100 illustrated in FIG. 6 includes a lid 105 and a base 110. Side walls 115 extend along a length of the cassette 100 and the cassette body also has two ends 120. The ends 120 and side walls 115 are spaced apart from each other to define a chamber 125 which can be used to store a horizontal stack 130 of cash notes 140. The stack 130 of cash notes is continually urged by a pusher plate 150 in the direction illustrated by arrow A in FIG. 6 towards a pick window (not shown) in an end wall (not shown) at an end of the cash cassette 100. The pusher plate 150 is constantly biased by a spring 155 which urges the pusher plate 150 towards the pick window end of the cash cassette 100.

The lid 105 and body of the cassette 100 are made of a rigid tamperproof material so that when the lid 105 is closed and locked and a shutter (not shown) of the pick window (not shown) is closed, the cassette 100 provides a housing to which it is difficult to gain access.

The cash cassette 100 illustrated in FIG. 6 has a permanent lock 170 in addition to its normal locking mechanism (not shown) which can be triggered when a determination is made (as described hereinbelow) that someone is tampering with the cash cassette 100. Once triggered, the lock 170 cannot be released without destroying the cassette 100 or without a special security key. The cash cassette 100 shown in FIG. 6 also illustrates a charge 175 of dye. If a determination is made (as described hereinbelow) that an unauthorized attempt has been made to access the cash cassette, the charge 175 may be triggered to void the media.

The cash cassette 100 as illustrated in FIG. 6 also includes a set of magnets 182 provided on the side wall 115 of the cash cassette 100. The magnets 182 are selectively arranged according to the characteristic of the cassette's contents and are utilized to program a set of Reed switches (not shown) arranged in an ATM proximate to where the cash cassette 100 is mounted when located in the ATM. A controller of the ATM ascertains the characteristic of contents in a respective cash cassette 100 in accordance with the detected arrangement of magnets on the respective cash cassette 100. A cover 184 is placed over the magnets to protect them from being moved when their desired arrangement has been selected and set in accordance with the cassette's contents.

The cash cassette 100 as illustrated in FIG. 6 also includes a wireless transceiver in the form of a near field communication (NFC) tag 180 which stores a unique identifier (UID) as well as having 2 k plus bytes of storage. The NFC tag 180 is fitted to or is integral with (or proximate to) the magnet cover 184. Inclusion of the NFC tag 180 makes the cassette an 'intelligent' cash cassette.

Figure 7:
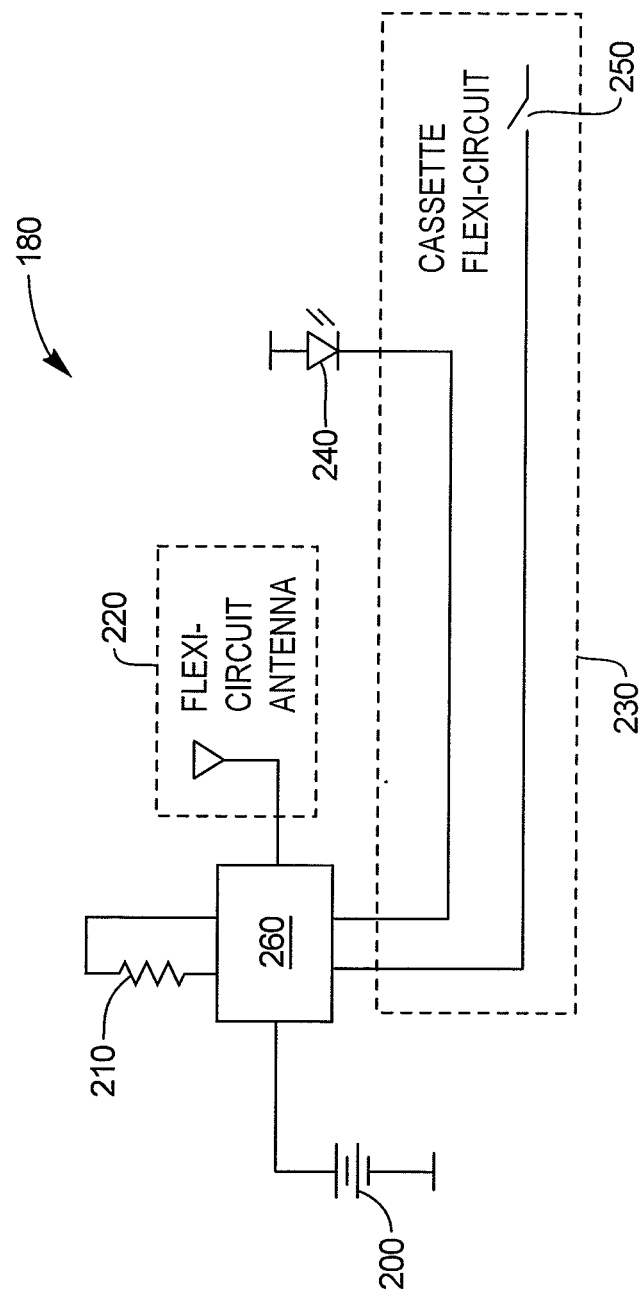
FIG. 7 illustrates circuitry associated with a near field communication (NFC) tag in the cash cassette shown in FIG. 6.

FIG. 7 illustrates the NFC tag 180 in more detail. The tag 180 is an active tag and thus includes a battery 200. In this embodiment, the battery 200 is a rechargeable battery. The tag 180 also includes a temperature sensor 210 or other such environmental sensor. The temperature sensor 210 can be monitored to detect when a lid of the cassette 100 is opened. A significant change in temperature or other such environmental parameter may be used to trigger an alarm.

The tag 180 also includes a flexible antenna circuit 220 which is used for near field communication with an initiator device (that is, another device fitted with an NFC transceiver). A flexi-circuit 230 extends within the container to a tri-color LED 240 or other such indicator. This enables a visible cue to be triggered indicating when the cassette 100 has been tampered with and/or opened. Optionally, the cue is a visible and/or audible cue.

A tamper switch 250 is provided in the form of a contact switch which determines when the lid 105 is separated from the body of the cassette 100. Alternatively, or additionally, a tamper switch may be utilized to identify unauthorized ingress through a pick window or other such opening. Optionally, a further security feature is included to prevent overriding through exposure to a large magnetic field or immersion in water. Particular areas that may be monitored are the cassette lid 105, pick window and the holder for the NFC tag 180.

When the switch 250 indicates a break in circuit, a determination is made that an attempt has been made to access the cassette 100. This is an example of an event which can be logged and stored via a processor 260 of the NFC tag 180. The processor 260 is coupled to a non-volatile memory (not shown) which can be used for storing data associated with contents of the cassette 100.

New cassettes may be manufactured to include the NFC tag 180 shown in FIG. 7 or such tags 180 may be retro-fitted to conventional cassettes 100.

The tag 180 is contactless in the sense that the tag 180 is able to communicate with an NFC reader which is also able to re-charge the battery 200 or supercapacitor or the like. The processor 260 continually monitors for a tamper condition and, with the use of an on-board real-time clock, can log an exact time that the cassette 100 is open/tampered with. This information can be extracted from the cassette 100 at a later moment in time with the use of an NFC reader. The NFC reader may be a mobile terminal or may be integrated into an existing self-service hardware item or transport element or storage zone, as further described below.

The NFC tag 180 includes a unique identification (ID) stored in the non-volatile memory. This non-volatile memory can be used to store logging information and other cassette contents details as noted above. Additional environmental information such as temperature and/or humidity or the like can also be collected and stored over a period of time. The contents of the non-volatile memory are referred to herein as the data set.

Cash notes are manually or automatically loaded into the intelligent cash cassette 100 by authorized personnel at a trusted and secure banknote loading center. The total number of cash notes and the denomination of the cash notes is programmed onto the memory of the NFC tag 180 associated with the cassette 100. In addition, the serial numbers of each cash note may also be programmed onto the memory in the order in which the cash notes are stored in the horizontal stack 130.

The data set associated with the cassette 100 may be stored remotely. In some embodiments, the NFC tag 180 may only store minimal information, such as the unique ID and the denomination of cash notes stored in the cassette 100. The full data set would be stored in a remote center and accessed using the unique ID from the NFC tag 180. A process to synchronize data held in two or more locations can optionally be utilized.

Figure 8:
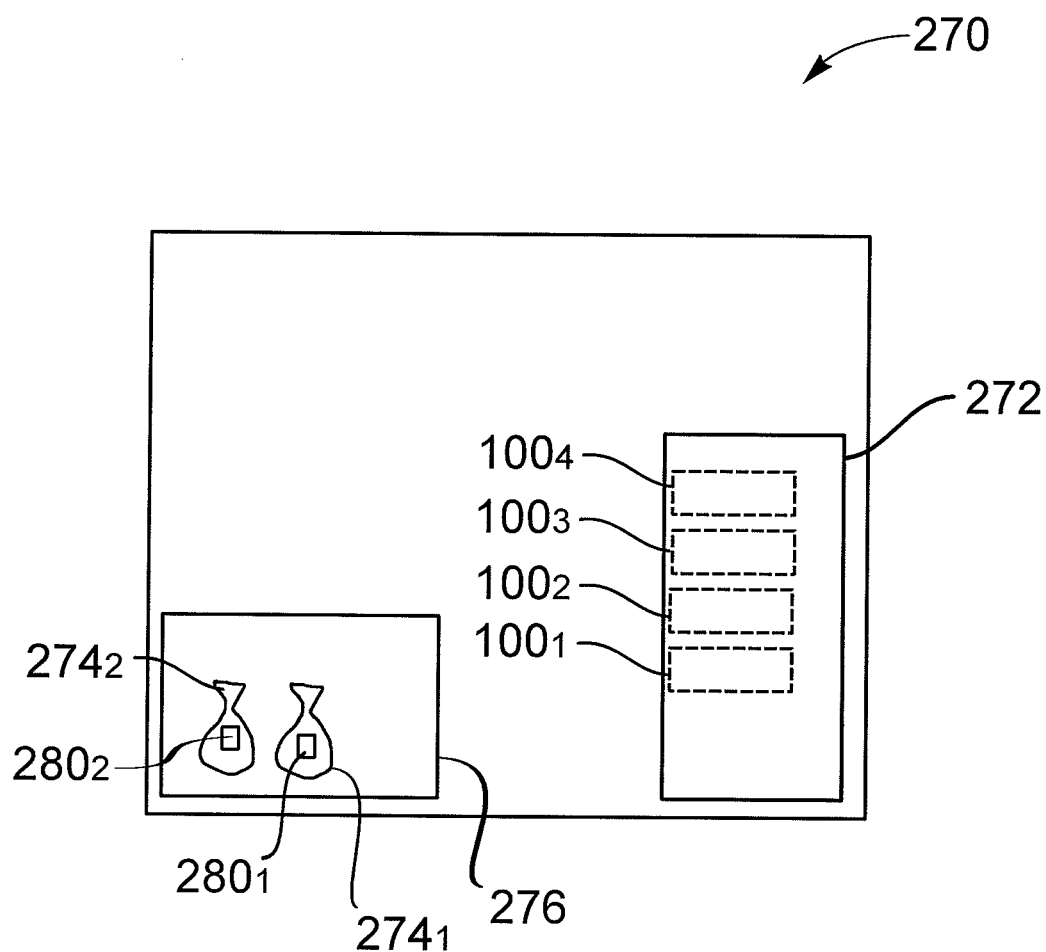
FIG. 8 illustrates a container store in the form of a cash-in-transit vehicle.

Reference will now also be made to FIG. 8, which is a simplified schematic diagram of a CIT vehicle 270. The CIT vehicle 270 is a Media Store that includes a cassette rack 272 into which a plurality of cash cassettes, such as cash cassette 100, can be racked into and removed from. The CIT vehicle 270 can also store individual cash bags 274 within a locked container 276. Each cash bag 274 is fitted with an NFC tag 280 (similar to NFC tag 180).

Figure 9:
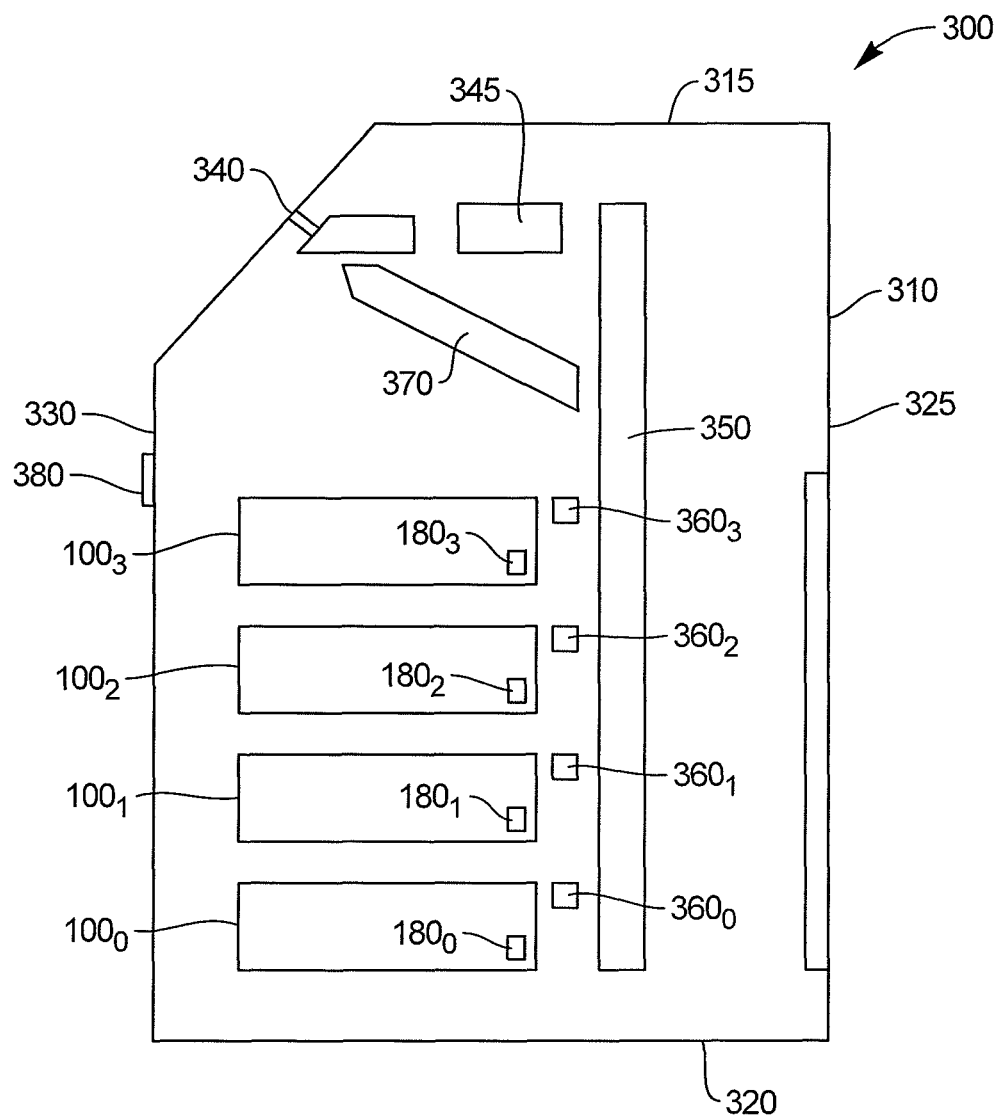
FIG. 9 illustrates a container store in the form of an Automated Teller Machine (ATM) in accordance with an embodiment of the present invention.

This data set information is subsequently delivered to a financial institution as part of a Cash-in-Transit (CIT) operation, using the CIT vehicle 270. The transported cassettes are then loaded into a bank vault or a terminal which can hold multiple cassettes. For example, shown in FIG. 9 is an ATM 300 able to hold four cash cassettes. An ATM 300 is thus an example of a container store. Optionally, each cash cassette $100_{0...3}$ stores a stack of notes having a pre-determined cash denomination. The ATM 300 includes a secure housing 310 which includes a top wall 315 and floor standing wall 320 together with a back wall 325, front fascia 330 and side walls (not shown). The front fascia 330 includes a bill entry/exit slot 340 and server via which a user can present a bunch of cash notes or single cash note. The bill entry/exit slot 340 is also an outlet slot whereby items of media such as cash notes are returned or are dispensed to a user dependent upon a user requirement. Cash notes deposited are validated by a bill validator 345. The bill validator includes imaging apparatus which can determine a denomination and serial number associated with each deposited cash note. A bill transport path 350 which includes one or more rollers and/or endless belts is used to locate items of media one-by-one or as a bunch at a desired storage cash cassette 100. The ATM 300 can thus be utilized to dispense cash notes which are stored in the cash cassette. Alternatively and/or additionally, the ATM can be utilized to receive cash notes deposited individually or as a bunch at the slot 340. Alternatively or additionally the ATM 300 provides a secure housing for full cash cassettes 100. Rather than receive and dispense cash notes one-by-one via a suitable pick mechanism, the terminal can thus be merely used as a storage unit for a whole cash cassette and its contents.

Each cash cassette $100_{0...3}$ includes a respective NFC tag $180_{0...3}$ which, when duly located in the ATM 300, is located sufficiently proximate to an antenna of a respective NFC reader $360_{0...3}$ so that wireless communication can automatically occur between a tag and its respective reader. The NFC tag 180 of a container is thus located proximate to a respective reader when the container is correctly mounted in the ATM 300. Of course, a single NFC reader may be used to wirelessly communicate with each cassette NFC tag $180_{0...3}$ if each cash cassette $100_{0...3}$ can be located sufficiently proximate to the single NFC reader. Either arrangement enables data to be read which can thus establish and associate data from each cash cassette with the terminal.

The ATM 300 which thus acts as a container store further includes a primary NFC tag 380 located to allow an authorized person to wirelessly read from the primary NFC tag 380 with a mobile NFC reader device, such as a smart phone or tablet. As shown in FIG. 9, the primary tag 380 in the illustrated embodiment is located externally on a front side of the ATM 300 for easy access and visibility by an authorized person. The primary NFC tag 380 may be hardwired to each NFC reader $360_{0...3}$ or may communicate with each NFC reader $360_{0...3}$ wirelessly. The primary NFC tag 380 includes a read/write data store for storing tag record data associated with each cash cassette $100_{0...3}$ located in the ATM 300. For example, the primary NFC tag 380 can store at least a unique ID of each cash cassette located in the terminal. This unique ID functions as an index number to index record data stored as a container record remotely, for example in a cloud-based data store, wherein the record data comprises information associated with each cassette, such as cassette ID and value/count/order/size etc. of cash notes located in a respective cassette. As cash cassettes are located in, replenished or removed from the ATM 300, the record data stored remotely is updated accordingly via the primary NFC tag. The ATM is connected to a network, wired or wireless, and the data last stored on the NFC tag is read by the NFC reader in the ATM cash handling device and uploaded to a remote server.

Alternatively or additionally, the primary NFC tag may store tag record data associated with cassettes located in the ATM, wherein the tag record data comprises more than just a unique ID or serial number of each respective cassette located in the ATM. The primary NFC tag may store other parameters associated with respective cassettes located in the ATM, such as cassette ID and value/count/order/size etc. of cash notes located in a respective cassette. The primary tag 380 is continuously updated with data responsive to changes to each respective cassette NFC tag 180, such as when cash notes are picked from respective cassettes and/or when a cassette 100$_{0...3}$ is located into or removed from the ATM 300.

In a further embodiment, record data stored remotely may be synchronized with tag record data stored in the primary NFC tag to ensure both data stores are updated accordingly in response to changes to each respective cassette NFC tag 180, such as when cash notes are picked from respective cassettes and/or when a cassette 100$_{0...3}$ is located into or removed from the ATM 300.

The primary NFC tag 380 allows an authorized person to retrieve information associated with at least one cash cassette 100$_{0...3}$ located in the ATM 300 either directly from the primary NFC tag via an NFC reader device or by indexing a cassette record stored remotely responsive to a unique identifier of a respective cassette provided by the primary NFC tag via an NFC reader device. An authorized person may retrieve information associated with at least one cash cassette 100$_{0...3}$ located in the ATM 300 without the need to gain access to each cassette located inside the ATM and/or to log on to an authorized user account via a user interface of the ATM to determine a cash position/status of the ATM, for example.

As mentioned above, the primary NFC tag 380 is wirelessly readable by a handheld NFC reader, such as a smart phone or tablet device, operable by an authorized person to receive up-to-date tag record data via the primary NFC tag 380 to determine information associated with the cassettes located in the ATM.

The tag record data may then be transferred from the handheld NFC reader to a remote server to update respective data stored there. The remote server may form part of a cash management system. The handheld NFC reader may communicate wirelessly with the remote server over the Internet, for example, to transfer data to/from the remote server and update data accordingly.

Alternatively or additionally, each NFC reader 360$_{0...3}$ of the ATM may communicate with a remote server either directly or via a primary NFC reader and transmitter/antenna arrangement. The NFC reader 360$_{0...3}$ of the ATM 300 may communicate with the remote server wirelessly via an antenna of the ATM 300, for example. In this embodiment, each cassette NFC tag 180$_{0...3}$ stores at least an index number associated with a respective cash cassette 100$_{0...3}$ which is used to index data stored remotely in a remote server or cloud-based data management system, for example. The index number associated with a respective cassette is then used to retrieve corresponding parameters associated with that cassette, such as unique ID, value of cash notes and/or quantity of cash notes contained therein, or the like, from tag record data stored remotely.

The ATM maintains the data stored on the primary NFC tag 380 and/or the remote server to ensure it accurately reflects the cash position of the ATM at any one time. This allows authorized personnel to retrieve accurate up-to-date information associated with an ATM, or other container store, either directly from the ATM and/or from a remote server such as a cloud data management store.

Figure 10:
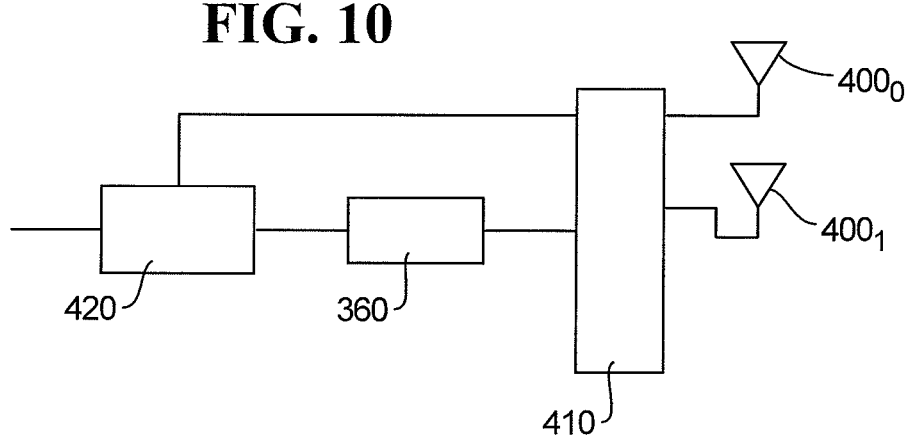
FIG. 10 illustrates a block diagram of a part of the ATM of FIG. 9, showing an interface which can read an NFC tag in a cash container or can detect the presence of magnets provided in conventional cash containers.

FIG. 10 illustrates a dual-pick interface card (DPIC) according to certain embodiments of the present invention which provides a dual-interface to two cash cassettes. A conventional Reed switch interface as well as an NFC antenna reader/interface is optionally provided. This allows the use of legacy magnetic switches for cassette configuration as well as NFC enabled configuration.

As illustrated in FIG. 10, each of the two near field communication antenna 400 are connected to a multiplexor 410. When one or more cash cassettes is in the terminal 300 which includes an NFC tag, these antenna read the appropriate information from a respective NFC tag and this information is selectively directed by the multiplexor 410 to a reader 360 which can then communicate to a primary ATM NFC tag and/or to a remote server/cloud based data management system, as described below. The multiplexor 410 connects a respective antenna to the reader under control of a control signal generated by the CPU 420. In use, a conventional identification system can be used to determine when a cassette is loaded in a terminal. For example, each cassette includes an array of magnets that set a matching array of Reed switches in a pre-set configuration. Subsequent to a cassette being identified, the NFC reader 360 receives antenna received data from the antenna associated with the reader. This is used to determine if the input cassette is a conventional cassette or is NFC enabled. If NFC enabled data can be read from (and thereafter optionally written to) the NFC tag, it can be determined that the cassette is NFC tag enabled.

Figure 11:
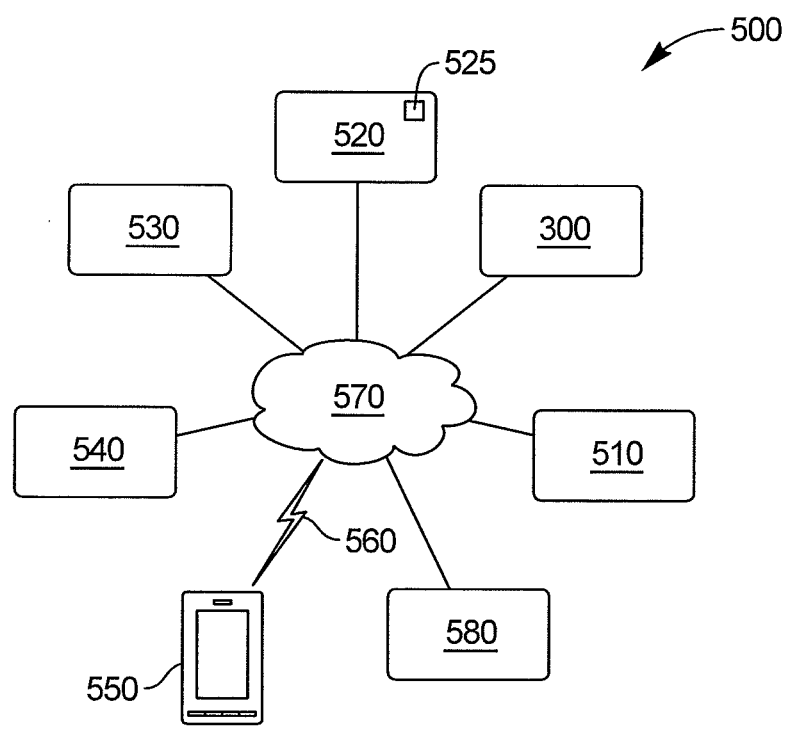
FIG. 11 illustrates a cash management system according to an embodiment of the present invention.

FIG. 11 illustrates a cash management system 500 for tracking cash and events which occur with respect to containers used to transport cash. The system includes one or more bank branches 510 which can be accessed by customers. The system 500 also includes one or more ATMs 300. These ATMs may be freestanding terminals provided at various locations and one or more of the ATMs themselves may be located in a respective bank branch 510. A cash management center (CMC) 520 is used to replenish containers, and access here is only provided to authorized personnel. The system 500 optionally includes a reporting and counting center (RCC) 525 as part of the CMC 520 (although such a center may be a discrete further node connected to the network or be incorporated in another node). The RRC 525 receives data from the various nodes of the system and stores characteristics associated with cash in transit and at the various locations in the system. For example, a total amount in the system, a total amount of £10 notes in the system, an amount of cash in one or more ATMs, an amount of cash in transit and/or replenishment data or the like. Such information can be used in real time or at the end of the day or week etc. to make decisions to improve efficiency and/or profitability.

A cash in transit (CIT) process 530 is illustrated in FIG. 11, and described below, during which cash in a cash container, such as a cash cassette or CIT bag, is moved from one location to another. Likewise, distribution 540 is illustrated whereby cash is transported in VMCs from one location to another via a distribution vessel, such as a truck. The cash management system also includes one or more mobile terminals 550. These may be smartphones or mobile phones or tablet computers or the like. These communicate wirelessly via a wireless communication link 560 to a network 570 such as the Internet. A remote server 580 or bank of servers is likewise connected to the Internet 570 for communication with the parties in the cash management system. The cash management system 500 thus includes multiple nodes with the bank branches 510 each being a respective node and the ATMs or other such SSTs each being a respective node and the management center 520 being a node and each item of cash in transit being an node and each distribution element being a node and each mobile terminal 550 being a node. The nodes are thus end points in the system. Optionally, the nodes are a CM Reporting Centre or user terminals in branches that are used to monitor cash levels.

It will be understood that a container store for locating one or more media item containers may be an SST, such as an ATM for locating cash cassettes, or a container store may alternatively or additionally take the form of a different enclosure for locating VMCs, e.g. a CIT or distribution vehicle, a room or vault in a building, or a freestanding safe, for example. As described above, each such container store in accordance with the present invention includes a primary device such as an NFC tag for providing tag record data to an authorized person via a NFC reading device for determining at least one parameter associated with at least one media item container, e.g. a cash cassette, CIT bag or the like, located in the container store. Such an arrangement provides a real-time cash management system for monitoring and tracking media item containers and at least one parameter thereof as they move around the CM system.

An example of cash management according to an embodiment of the present invention will now be described. Cash notes are contained in respective cash bags and stored in a secure enclosure, such as a vault in a building. Each cash bag is provided with a secondary tag as a bag NFC tag to store at least a unique identifier (UID), e.g. a serial number, and/or at least one parameter of the notes contained therein, such as cash value etc. The vault is provided with a vault NFC reader arranged to detect and receive tag record data from the bag NFC tags. For example, an authorized person may be required to hold a cash bag up to the vault NFC reader when locating or removing a cash bag in/from the vault for the respective bag NFC tag to be read by the reader. Alternatively, this association is carried out via a mobile terminal that can read data and update data in the primary NFC tag and/or a remote server node accordingly.

The vault NFC reader communicates with a primary vault NFC tag for providing tag record data associated with the cash bags contained in the vault. The vault NFC tag includes a data store for storing tag record data which is continuously updated responsive to cash bags being added to and removed from the vault to thereby provide information associated with each cash bag stored in the vault, such as a bag ID and/or contents of the bag, e.g. the total amount of cash and/or different values of cash notes in a respective cash bag. An authorized user may then simply retrieve such information from the vault NFC tag via an NFC reader device to determine the contents of the vault at any one time.

The vault NFC tag may be located such that an authorized person may scan the vault NFC tag with a mobile NFC reader, such as a handheld device, to retrieve information associated with the cash bags located in the vault. Such a location may be on an external wall of the vault and adjacent to a door, for example, which may allow a person without security access into the vault to identify contents of the vault. Alternatively or additionally, a vault NFC tag may be located on an internal wall of the vault to only allow authorized personnel with security access to identify contents of the vault via the vault NFC tag.

The vault NFC reader may communicate via a transmitter/antenna or wired connection with a remote server or cloud-based data management system which stores data and which is continuously updated responsive to cash bags or other such containers being added to and removed from the vault. Each bag NFC tag may store a unique identifier for each respective bag contents of which may be indexed using tag record data in an entry on a remote server for retrieving an array of information associated with respective cash bags and thereby the contents of the vault. The tag record data optionally includes additional parameters associated with a respective cash bag, such as cash value, quantity, source of origin, or the like, and by doing so provides an indication of the contents of the vault.

The record data thus optionally provides all needed information or can be used solely as an indexing mechanism to identify a record stored remotely that is associated with the respective container.

When required, the cash bags are removed from the vault and the vault NFC tag and/or remote data store updated accordingly. The cash bags may be located in CIT containers for transporting in a CIT vehicle to one or more SSTs which require replenishing. The CIT vehicle itself optionally includes a vehicle NFC reader for receiving data from the bag NFC tags or an NFC tag of a CIT container in which cash is being transited. In a similar manner to the ATM described above, the CIT vehicle optionally includes a primary device such as an NFC tag as a vehicle NFC tag which can communicate with a vehicle NFC reader.

As the CIT vehicle is loaded and unloaded, the vehicle NFC reader communicates with a remote server to continuously index cash bag records against tag record data stored remotely so that the cash being transited can be tracked and monitored accurately.

Alternatively or additionally, information associated with the CIT containers being transited can be transferred from the vehicle NFC reader to a vehicle NFC tag for scanning by an authorized person via a mobile NFC reader. The mobile NFC reader may simply display information associated with the CIT containers located in the CIT vehicle and/or may communicate such information with the remote server/cloud data store via a wireless communication link. Furthermore, the vehicle NFC reader may communicate With the remote server/cloud data store via a transmitter/antenna located on the vehicle.

The cash notes are then loaded into one or more respective cash cassettes (or suitable cash cassettes may be used throughout a cash flow as a secure container) before being located in an SST, such as an ATM as described above and shown in FIG. 9, which requires replenishing. Each cash cassette includes a cassette NFC tag which can be read via a handheld NFC device once the cassette has been loaded with cash notes. The cash cassettes can then be located in the ATM which includes at least one ATM NFC reader located near the cassette NFC tags when the cassettes are located in the ATM. The ATM may include multiple ATM NFC readers each located proximate to a respective cassette NFC tag when each cassette is located in the ATM. The ATM NFC readers communicate with each cassette NFC tag to receive data from them.

The ATM NFC reader may optionally transfer data to/from the remote server via a transmitter/antenna of the ATM. Alternatively or additionally, the ATM comprises an ATM NFC tag which can communicate with the at least one ATM NFC reader. Tag record data may be stored in a data store of the ATM NFC tag to be provided to an authorized person via a mobile NFC reader device. The mobile NFC reader device downloads data to the remote server for transferring data to/from the ATM NFC tag and the remote server.

Therefore, tag record data at a primary device can be stored and updated to accurately reflect the cash status of the ATM at any one time in terms of, for example only, the number and ID of cash cassettes present in the ATM, the number, value and total of cash notes present in respective cassettes, and whether a cash cassette has been tampered with during transit from the vault to the ATM. An authorized person may retrieve such information from the ATM NFC tag via a mobile NFC reader and/or such information may be transferred to/from a remote server/cloud data store, and updated, via a suitable communication link/network.

It will be appreciated that certain embodiments of the present invention can utilize a "basic" NFC tag which simply contains a UID. This is generally a unique hexadecimal identifier up to 16 bytes and has read only value and no modifiable data available. Alternatively, a "basic storage" tag can be utilized which contains a UID as well as an additional 48 bytes of storage which may be read four words at a time and written one word at a time. This form of storage has a limitation in that it has a maximum write cycle of 10,000 writes. Basic storage tags allow storage of note types denomination, exponent details, note sizes, thresholds, as well as cash bag or cassette ID, for example. Certain embodiments of the present invention can use "larger storage" tags which contain a UID as well as 2 k plus bytes of storage and which have similar read/write characteristics as the basic storage tag. Such larger storage tags, however, have a write cycle of between 1 million writes and $10^{15}$ writes and therefore can contain tally and telemetry information in addition to the information held by other tag types. Certain alternative embodiments utilize WRITE ONCE memory which can be used to identify valid NCR tags.

Data stored in an NFC tag may be read and/or write protected and the information associated with the data which is stored may include one or more of a unique identifier (i.e. equivalent to a "MAC" address), a unique container ID (equivalent to an "IP" address), an identifier for an original manufacturing plant of the container, an identifier for a manufacturing date associated with the container, a last date of service, a last service location identifier, a health status (i.e. either "green", "orange", "red" or some other specific percentage of transactions ended non-nominal), an identifier of a last cash point where the container was/is inserted, an identifier of the last synchronization time, date and time zone, a number of automated note movements through the cassette, a number of objects currently stored in the container, a main cash type stored in the container, a main denomination currently stored in the container, a current security status, a last security status, a last security status time, date and time zone, five customized fields per object, an object list currently stored in the container, a number of objects in the container, an order of objects in the container with a direction of order identifier, a unique object ID for each object stored in the container (i.e. banknote serial number for each stored banknote), an ISO code if an object stored in the container is a banknote, check, voucher or the like, an object denomination, an object emission (month/year), an object fitness level (use ECB for base), an object authenticity level (use ECB for base) and/or an actual object size for one or more objects in the container.

There are many NFC tag types available in various ISO standards such as ISO 15693, ISO 14443-A, ISO 14443-B, ISO 14443-B(SRIxx) and ISO 18092. It will be appreciated that certain embodiments of the present invention are not restricted to NFC tags having any pre-determined ISO standard compatibility. Rather, certain embodiments of the present invention are broadly applicable to the use of NFC tags. Optionally, for example, the ATM NFC tag 380 is powered by and read via an NFC antenna of the ATM using a frequency of about around 13.56 MHz. It will be appreciated that NFC is a set of short-range wireless technologies which require devices communicating with each other to be separated by a distance of 20 cm or less. Optionally, communication between a tag and a reader occurs over a distance of 4 cm or less. The communication operates at about around 13.56 MHz with data rate exchanges ranging from about around 106 kbit/s to 424 kbit/s. In passive NFC tags a reader acts as an initiator device and provides a carrier field whilst the NFC tag acts as a target device answering the field generated by the initiator device by modulating the existing field. In this way, the target device may draw its operating power from the initiator-provided electromagnetic field. This is thus a passive communication mode. Certain embodiments of the present invention can optionally use such passive NFC tags or alternatively can utilize NFC tags able to operate in a so-called active communication mode. In this mode, both the initiator device and target device communicate by alternatively generating their own fields. Each device de-activates its own RF field whilst waiting for data. Active NFC tags thus have their own power (which may optionally be rechargeable) and are able to generate their own detectable field. If a more basic tag is utilized as a primary device then data stored in it is used as an index to a remotely held record. If the primary device has more data storage capacity then more information can be stored locally.

Certain embodiments of the present invention have been described as using NFC. It will be appreciated that other forms of data store and communication protocols could be utilized such as Radio Frequency (RF), Microwave (MW) and/or Infrared (IR), Global Navigation System (GNSS) or Cellular Network (CN) based links.

Various modifications may be made to the above described embodiments within the scope of the present invention. For example, in the first embodiment, the handheld device 18 is described as a smartphone, but in other embodiments, a variety of different handheld devices may be provided, including a smartphone, an internet tablet, a personal digital assistant, an electronic reader, a scanner, or the like.

In the above embodiments, the cash management application 38 is described as collating information prior to transmitting the collated information to the cash management service 17. This may have advantages where the cash management application 38 is not in constant communication with the cash management service 37, for example, because no cellular or WiFi signal is available in the vault 14. However, in other embodiments, the cash management application 38 may provide information to the cash management service 17 as soon as it is entered by the staff member (that is, without collating transaction details and sending the entire transaction).

In the above embodiments, the cash management service 17 stores details of a cash order and the individual tags on the cash containers only store the unique identifier. However, in other embodiments, each tag may store details of the cash order so that a cash container can be reconciled even if the handheld device does not have any network access to the cash management service 17. This may be useful in a secure vault environment where (i) the walls of the vault are so thick that no network signal is available, (ii) the area is so secure that no network connections are permitted, or (iii) there is a temporary loss of network connectivity. Individual tags may be programmable (such as NFC or RFID tags) or they may be created to encode the cash details (such as a custom printed 2D barcode). Cryptographic techniques (such as asymmetric encryption keys) may be used to secure the encoded unique identifier and/or the cash details stored on the tag. Similarly, encryption techniques may be used for communications between the cash management service 17 and the handheld devices 18 and other devices in the system 10.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The method steps described may be performed in any convenient order, and are not limited to the order described except when one step necessarily precedes a subsequent step. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of managing transfer of cash, the method comprising:
   providing, to a first location, details of cash to be loaded into a machine-readable cash container;
   associating the cash details with a unique identifier for the cash container and identifying with the cash details, details of cash delivery that include a destination at which the cash is to be delivered, a name of a person, a company that will deliver the cash, a vehicle registration used to deliver the cash, and a time at which the cash is to be delivered;
   storing the associated unique identifier and cash details;
   receiving, from a second location to which the cash container has been transported, a request including the unique identifier read from the cash container using a Near Field Communication (NFC) reader where the unique identifier is communicated from the cash container using an NFC tag, and the NFC reader is incorporated into a smart phone, wherein receiving further includes receiving the request from a client application executing on a handheld device in response to a moving the cash to the second location, and the client application configured to accept user selection of commands for counting the cash, removing some of the cash, adding new cash, moving the cash, and supplying specific identifiers for specific cash containers, wherein the commands are communicated from the handheld device to a cash management service executing on a cash management server and when a communication link is missing between the client application and the cash management service, the commands are cached and immediately transferred to the cash management server when the communication link becomes available;
   accessing the stored cash details using the unique identifier; and
   providing the stored cash details to the second location.

2. A method according to claim 1, wherein the method comprises the further step of receiving, from the first location, further details of cash loaded into a machine-readable cash container.

3. A method according to claim 1, wherein the step of providing the unique identifier to the first location includes the step of identifying a unique identifier that is located at the first location.

4. A method according to claim 1, wherein the first location is registered as one of a plurality of predefined types of location.

5. A method according to claim 1, wherein the details of cash loaded into a machine-readable cash container include at least one of the following: (i) details about the cash; (ii) details of the cash loading; and (iii) details of a cash order to be fulfilled.

6. A method according to claim 5, wherein details about the cash include at least one of the following: the total amount of cash loaded, the amount of each denomination loaded, the number of items of each denomination, and the serial number of each banknote.

7. A method according to claim 5, wherein details of the cash loading include at least one of the following: a location where the cash was loaded and the names of the people who loaded the cash.

8. A method according to claim 5, wherein details of a cash order to be fulfilled include at least one of: a cash order serial number, a transaction number, and an indication of whether the cash order has been fulfilled.

9. A method according to claim 1, wherein the machine-readable cash container comprises: a currency cassette.

10. A method of operating a handheld device to reconcile a cash order received at a cash delivery location, the method comprising:
    reading, using a client application executing on the handheld device, a unique identifier on a received cash container, wherein the handheld device is a Near Field Communication (NFC) reader that reads an NFC tag of the cash container to obtain the unique identifier, and wherein the handheld device is a smart phone;
    sending, by the client application, a request for details of cash loaded into the received cash container based on the read unique identifier;
    receiving the requested details by the client application and identifying with the requested details, details of cash delivery that include a destination at which the cash is to be delivered, a name of a person, a company that will deliver the cash, a vehicle registration used to deliver the cash, and a time at which the cash is to be delivered; and
    sending, by the client application from the handheld device, a cash receipt confirmation message confirming that an amount of cash in the received cash container matches the requested details, the client application configured to accept user selection of commands for counting the cash, removing some of the cash, adding new cash, moving the cash, and supplying specific identifiers for specific cash containers, wherein the commands are communicated from the handheld device to a cash management service executing on a cash management server immediately when a communication link is available and when the communication link is missing or unavailable between the client application and the cash management service, the commands are cached and immediately transferred to the cash management server when the communication link becomes available.

11. A method according to claim 10, wherein the method includes the further step of sending a cash receipt confirmation message confirming that an amount, of cash in the received cash container matches the requested details.

12. A method of managing transfer of valuable media, the method comprising:
providing electronic notification of a valuable media transfer, the notification including details of a machine-readable valuable media container having a Near Field Communication (NFC) tag for wireless communication with a NFC reader that is incorporated into a smart phone and identifying with the details, details of cash delivery that include a destination at which the cash is to be delivered, a name of a person, a company that will deliver the cash, a vehicle registration used to deliver the cash, and a time at which the cash is to be delivered;
associating the valuable media transfer with a unique identifier associated with the valuable media container; and
updating the valuable media transfer as complete in response to an electronic completion notification, where the electronic completion notification includes the unique identifier associated with the valuable media container, wherein updating the valuable media transfer as complete in response to an electronic completion notification further comprises receiving the electronic completion notification from an authorized application executing on the registered handheld device, the authorized application configured to accept user selection of commands for counting the cash, removing some of the cash, adding new cash, moving the cash, and supplying specific identifiers for specific cash containers, wherein the commands are communicated from the handheld device to a cash management service executing on a cash management server and when a communication link is missing between the client application and the cash management service, the commands are cached and immediately transferred to the cash management server when the communication link becomes available.

13. A method according to claim 12, wherein the electronic completion notification also includes confirmation of completion from at least two different authorized users.

14. A method according to claim 12, wherein the method includes the further steps of: storing the associated unique identifier and details of the valuable media transfer.

15. A method according to claim 14, wherein the method includes the further step of: receiving a request including the unique identifier read from the valuable media container prior to the step of updating the valuable media transfer as complete.

16. A method according to claim 15, wherein the method includes the further steps of: accessing the stored valuable media transfer details using the unique identifier in response to receipt of a request including the unique identifier; and providing the stored valuable media transfer details.

17. A method according to claim 12, wherein providing electronic notification of a valuable media transfer includes sending the electronic notification to a cash-in-transit location.

* * * * *